United States Patent
Cadugan et al.

(10) Patent No.: US 12,517,230 B2
(45) Date of Patent: Jan. 6, 2026

(54) PHOTOSENSOR HAVING RANGE PARALLAX COMPENSATION

(71) Applicant: Allegro MicroSystems, LLC, Manchester, NH (US)

(72) Inventors: Bryan Cadugan, Bedford, NH (US); Andrew S. Huntington, Banks, OR (US); Sapna S. Mukherjee, Portland, OR (US); Adam Lee, Portland, OR (US); George Williams, Vashon, WA (US); Richard Migliaccio, Mount Sinai, NY (US); William P. Taylor, Amherst, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 939 days.

(21) Appl. No.: 17/659,033

(22) Filed: Apr. 13, 2022

(65) Prior Publication Data
US 2023/0333216 A1 Oct. 19, 2023

(51) Int. Cl.
*G01S 7/4863* (2020.01)
*G01S 7/481* (2006.01)
(Continued)

(52) U.S. Cl.
CPC .......... *G01S 7/4863* (2013.01); *G01S 7/4816* (2013.01); *G01S 7/4865* (2013.01); *G01S 17/894* (2020.01); *G02B 1/10* (2013.01); *G02B 5/0273* (2013.01)

(58) Field of Classification Search
CPC ..... G01S 7/4816; G01S 7/4865; G01S 17/894
See application file for complete search history.

(56) References Cited

U.S. PATENT DOCUMENTS 5,076,687 A * 12/1991 Adelson ............... G01C 3/08
396/113
6,760,145 B1 7/2004 Taylor et al.
(Continued)

FOREIGN PATENT DOCUMENTS

CA 3 085 648 21 6/2019
EP 2 998 700 A1 3/2016
(Continued)

OTHER PUBLICATIONS

PCT International Search Report and Written Opinion dated May 26, 2023 for International Application No. PCT/US2023/064528; 17 Pages.

(Continued)

*Primary Examiner* — Thanh Luu
(74) *Attorney, Agent, or Firm* — DALY, CROWLEY, MOFFORD & DURKEE, LLP

(57) ABSTRACT

Methods and apparatus for photodetection having parallax compensation for near and far object signal return. In embodiment, a photoreceiver comprising a at least one light-sensitive pixel to transduce light to electrical signals has at least a first one of the pixels including a first subpixel region having a first light response characteristic and a second subpixel region having a second light response characteristic, wherein the first and second light characteristics are configured to correspond to variations in intensity of reflected light from objects at different distances when the portion of the reflected light reaching the first one of the pixels imaged onto the first and second subpixel regions.

39 Claims, 16 Drawing Sheets

(51) Int. Cl.
  *G01S 7/4865* (2020.01)
  *G01S 17/894* (2020.01)
  *G02B 1/10* (2015.01)
  *G02B 5/02* (2006.01)

(56) References Cited

U.S. PATENT DOCUMENTS

| | | |
|---|---|---|
| 6,778,728 B2 | 8/2004 | Taylor et al. |
| 6,894,823 B2 | 5/2005 | Taylor et al. |
| 6,989,921 B2 | 1/2006 | Bernstein et al. |
| 7,015,780 B2 | 3/2006 | Bernstein et al. |
| 7,160,753 B2 | 1/2007 | Williams, Jr. |
| 7,432,537 B1 | 10/2008 | Huntington |
| 7,504,053 B1 | 3/2009 | Alekel |
| 7,764,719 B2 | 7/2010 | Munroe et al. |
| 7,782,911 B2 | 8/2010 | Munroe et al. |
| 7,852,549 B2 | 12/2010 | Alekel et al. |
| 7,885,298 B2 | 2/2011 | Munroe |
| 7,994,421 B2 | 8/2011 | Williams et al. |
| 8,207,484 B1 | 6/2012 | Williams |
| 8,319,307 B1 | 11/2012 | Williams |
| 8,570,372 B2 | 10/2013 | Russell |
| 8,597,544 B2 | 12/2013 | Alekel |
| 8,630,036 B2 | 1/2014 | Munroe |
| 8,630,320 B2 | 1/2014 | Munroe et al. |
| 8,730,564 B2 | 5/2014 | Alekel |
| 8,743,453 B2 | 6/2014 | Alekel et al. |
| 8,760,499 B2 | 6/2014 | Russell |
| 8,766,682 B2 | 7/2014 | Williams |
| 8,853,639 B2 | 10/2014 | Williams, Jr. |
| 8,908,157 B2 | 12/2014 | Eisele et al. |
| 9,121,762 B2 | 9/2015 | Williams et al. |
| 9,197,233 B2 | 11/2015 | Gaalema et al. |
| 9,269,845 B2 | 2/2016 | Williams et al. |
| 9,368,933 B1 | 6/2016 | Nijjar et al. |
| 9,397,469 B1 | 7/2016 | Nijjar et al. |
| 9,447,299 B2 | 9/2016 | Schut et al. |
| 9,451,554 B1 | 9/2016 | Singh et al. |
| 9,466,745 B2 | 10/2016 | Williams et al. |
| 9,553,216 B2 | 1/2017 | Williams et al. |
| 9,591,238 B2 | 3/2017 | Lee et al. |
| 9,693,035 B2 | 6/2017 | Williams et al. |
| 9,759,602 B2 | 9/2017 | Williams |
| 9,804,264 B2 | 10/2017 | Villeneuve et al. |
| 9,810,775 B1 | 11/2017 | Welford et al. |
| 9,810,777 B2 | 11/2017 | Williams et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,835,490 B2 | 12/2017 | Williams et al. |
| 9,841,495 B2 | 12/2017 | Campbell et al. |
| 9,843,157 B2 | 12/2017 | Williams |
| 9,847,441 B2 | 12/2017 | Huntington |
| RE46,672 E | 1/2018 | Hall |
| 9,857,468 B1 | 1/2018 | Eichenholz et al. |
| 9,869,754 B1 | 1/2018 | Campbell et al. |
| 9,874,635 B1 | 1/2018 | Eichenholz et al. |
| 9,897,687 B1 | 2/2018 | Campbell et al. |
| 9,905,992 B1 | 2/2018 | Welford et al. |
| 9,923,331 B2 | 3/2018 | Williams |
| 9,941,433 B2 | 4/2018 | Williams et al. |
| 9,958,545 B2 | 5/2018 | Eichenholz et al. |
| 9,989,629 B1 | 6/2018 | LaChapelle |
| 9,995,622 B2 | 6/2018 | Williams |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,061,019 B1 | 8/2018 | Campbell et al. |
| 10,088,559 B1 | 10/2018 | Weed et al. |
| 10,094,925 B1 | 10/2018 | LaChapelle |
| 10,114,111 B2 | 10/2018 | Russell et al. |
| 10,121,813 B2 | 11/2018 | Eichenholz et al. |
| 10,139,478 B2 | 11/2018 | Gaalema et al. |
| 10,169,678 B1 | 1/2019 | Sachdeva et al. |
| 10,169,680 B1 | 1/2019 | Sachdeva et al. |
| 10,175,345 B2 | 1/2019 | Rhee et al. |
| 10,175,697 B1 | 1/2019 | Sachdeva et al. |
| 10,191,155 B2 | 1/2019 | Curatu |
| 10,209,359 B2 | 2/2019 | Russell et al. |
| 10,211,592 B1 | 2/2019 | Villeneuve et al. |
| 10,211,593 B1 | 2/2019 | Lingvay et al. |
| 10,217,889 B2 | 2/2019 | Dhulla et al. |
| 10,218,144 B2 | 2/2019 | Munroe et al. |
| 10,241,198 B2 | 3/2019 | LaChapelle et al. |
| 10,254,388 B2 | 4/2019 | LaChapelle et al. |
| 10,254,762 B2 | 4/2019 | McWhirter et al. |
| 10,267,898 B2 | 4/2019 | Campbell et al. |
| 10,267,899 B2 | 4/2019 | Weed et al. |
| 10,267,918 B2 | 4/2019 | LaChapelle et al. |
| 10,275,689 B1 | 4/2019 | Sachdeva et al. |
| 10,295,668 B2 | 5/2019 | LaChapelle et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,338,199 B1 | 7/2019 | McWhirter et al. |
| 10,338,223 B1 | 7/2019 | Englard et al. |
| 10,340,651 B1 | 7/2019 | Drummer et al. |
| 10,345,437 B1 | 7/2019 | Russell et al. |
| 10,345,447 B1 | 7/2019 | Hicks |
| 10,348,051 B1 | 7/2019 | Shah et al. |
| 10,386,489 B2 | 8/2019 | Albelo et al. |
| 10,394,243 B1 | 8/2019 | Ramezani et al. |
| 10,401,480 B1 | 9/2019 | Gaalema et al. |
| 10,401,481 B2 | 9/2019 | Campbell et al. |
| 10,418,776 B2 | 9/2019 | Welford et al. |
| 10,445,599 B1 | 10/2019 | Hicks |
| 10,451,716 B2 | 10/2019 | Hughes et al. |
| 10,473,788 B2 | 11/2019 | Englard et al. |
| 10,481,605 B1 | 11/2019 | Maila et al. |
| 10,488,496 B2 | 11/2019 | Campbell et al. |
| 10,491,885 B1 | 11/2019 | Hicks |
| 10,502,831 B2 | 12/2019 | Eichenholz |
| 10,503,172 B2 | 12/2019 | Englard et al. |
| 10,509,127 B2 | 12/2019 | Englard et al. |
| 10,514,462 B2 | 12/2019 | Englard et al. |
| 10,520,602 B2 | 12/2019 | Villeneuve et al. |
| 10,523,884 B2 | 12/2019 | Lee et al. |
| 10,535,191 B2 | 1/2020 | Sachdeva et al. |
| 10,539,665 B1 | 1/2020 | Danziger et al. |
| 10,545,240 B2 | 1/2020 | Campbell et al. |
| 10,551,485 B1 | 2/2020 | Maheshwari et al. |
| 10,551,501 B1 | 2/2020 | LaChapelle |
| 10,557,939 B2 | 2/2020 | Campbell et al. |
| 10,557,940 B2 | 2/2020 | Eichenholz et al. |
| 10,571,567 B2 | 2/2020 | Campbell et al. |
| 10,571,570 B1 | 2/2020 | Paulsen et al. |
| 10,578,720 B2 | 3/2020 | Hughes et al. |
| 10,591,600 B2 | 3/2020 | Villeneuve et al. |
| 10,591,601 B2 | 3/2020 | Hicks et al. |
| 10,606,270 B2 | 3/2020 | Englard et al. |
| 10,627,495 B2 | 4/2020 | Gaalema et al. |
| 10,627,512 B1 | 4/2020 | Hicks |
| 10,627,516 B2 | 4/2020 | Eichenholz |
| 10,627,521 B2 | 4/2020 | Englard et al. |
| 10,636,285 B2 | 4/2020 | Haas et al. |
| 10,641,874 B2 | 5/2020 | Campbell et al. |
| 10,663,564 B2 | 5/2020 | LaChapelle |
| 10,663,585 B2 | 5/2020 | McWhirter |
| 10,677,897 B2 | 6/2020 | LaChapelle et al. |
| 10,677,900 B2 | 6/2020 | Russell et al. |
| 10,684,360 B2 | 6/2020 | Campbell |
| 11,252,359 B1 | 2/2022 | Huntington et al. |
| 2008/0266544 A1 | 10/2008 | Wolf et al. |
| 2009/0009747 A1* | 1/2009 | Wolf ............ G01S 17/08 356/4.01 |
| 2009/0147239 A1* | 6/2009 | Zhu ............ G01S 7/4817 356/5.01 |
| 2012/0188557 A1 | 7/2012 | Goodwin et al. |
| 2014/0078491 A1 | 3/2014 | Eisele et al. |
| 2018/0069367 A1 | 3/2018 | Villeneuve et al. |
| 2018/0284239 A1 | 10/2018 | LaChapelle et al. |
| 2018/0284240 A1 | 10/2018 | LaChapelle et al. |
| 2018/0284275 A1 | 10/2018 | LaChapelle |
| 2018/0284280 A1 | 10/2018 | Eichenholz et al. |

(56) References Cited

U.S. PATENT DOCUMENTS

| | | | |
|---|---|---|---|
| 2018/0341009 A1 | 11/2018 | Niclass et al. | |
| 2019/0285732 A1 | 9/2019 | Retterath et al. | |
| 2019/0310368 A1 | 10/2019 | LaChapelle | |
| 2020/0049822 A1* | 2/2020 | Matsui | G01S 7/4863 |
| 2021/0173052 A1 | 6/2021 | Onal et al. | |
| 2021/0199809 A1 | 7/2021 | Wynn | |
| 2021/0341621 A1 | 11/2021 | Ignatescu et al. | |
| 2021/0349192 A1 | 11/2021 | Wang et al. | |

FOREIGN PATENT DOCUMENTS

| | | |
|---|---|---|
| EP | 2 475 958 B1 | 11/2016 |
| EP | 3 557 284 A2 | 10/2019 |
| EP | 3 557 284 A3 | 4/2020 |
| TW | 201422772 | 6/2014 |
| WO | WO 2018/140522 A2 | 8/2018 |
| WO | WO 2018/140522 A3 | 8/2018 |
| WO | WO 2020/131754 A2 | 6/2020 |
| WO | WO 2020/131754 A3 | 6/2020 |
| WO | WO 2022/011974 A1 | 1/2022 |

OTHER PUBLICATIONS

Extended European Search Report dated Dec. 13, 2024, for European Patent Application No. 24184090.9; 12 pages.

Acerbi et al., "Silicon Photomultipliers: Technology Optimizations for Ultraviolet, Visible and Near-Infrared Range"; Instruments, 3, 15; Feb. 2019; 15 pages.

U.S. Appl. No. 17/809,990, filed Jun. 30, 2022, Quirk et al.
U.S. Appl. No. 17/805,070, filed Jun. 2, 2022, Myers et al.
U.S. Appl. No. 17/663,896, filed May 18, 2022, Cadugan et al.
U.S. Appl. No. 17/660,221, filed Apr. 22, 2022, Filippini et al.
U.S. Appl. No. 17/659,035, filed Apr. 13, 2022, Cadugan et al.
U.S. Appl. No. 17/656,981, filed Mar. 29, 2022, Myers et al.
U.S. Appl. No. 17/656,978, filed Mar. 29, 2022, Myers et al.
U.S. Appl. No. 17/656,977, filed Mar. 29, 2022, Myers et al.
U.S. Appl. No. 17/657,140, filed Mar. 20, 2022, Myers.
U.S. Appl. No. 17/653,881, filed Mar. 8, 2022, Keuleyan et al.
U.S. Appl. No. 17/651,250, filed Feb. 16, 2022, Marshall.
U.S. Appl. No. 17/648,702, filed Jan. 24, 2022, Lee et al.
U.S. Appl. No. 17/566,763, filed Dec. 31, 2021, Huntington et al.
U.S. Appl. No. 17/402,065, filed Aug. 13, 2021, Lee et al.
U.S. Appl. No. 17/400,300, filed Aug. 12, 2021, Myers et al.
U.S. Appl. No. 17/376,607, filed Jul. 15, 2021, Stewart et al.
U.S. Appl. No. 17/352,937, filed Jun. 21, 2021, Cadugan et al.
U.S. Appl. No. 17/230,277, filed Apr. 14, 2021, Judkins, III et al.
U.S. Appl. No. 17/230,276, filed Apr. 14, 2021, Cadugan.
U.S. Appl. No. 17/230,253, filed Apr. 14, 2021, Judkins, III et al.
U.S. Appl. No. 17/197,328, filed Mar. 30, 2021, Taylor et al.
U.S. Appl. No. 17/197,314, filed Mar. 10, 2021, Taylor et al.
PCT International Search Report and Written Opinion dated Jun. 13, 2023 for International Application No. PCT/US2023/064526; 15 Pages.
U.S. Non-Final Office Action dated May 29, 2025 for U.S. Appl. No. 17/659,035; 9 Pages.
Response to U.S. Non-Final Office Action dated May 29, 2025 for U.S. Appl. No. 17/659,035; Response Filed Jun. 23, 2025; 12 Pages.
U.S. Final Office Action dated Jul. 2, 2025 for U.S. Appl. No. 17/659,035; 9 Pages.

\* cited by examiner

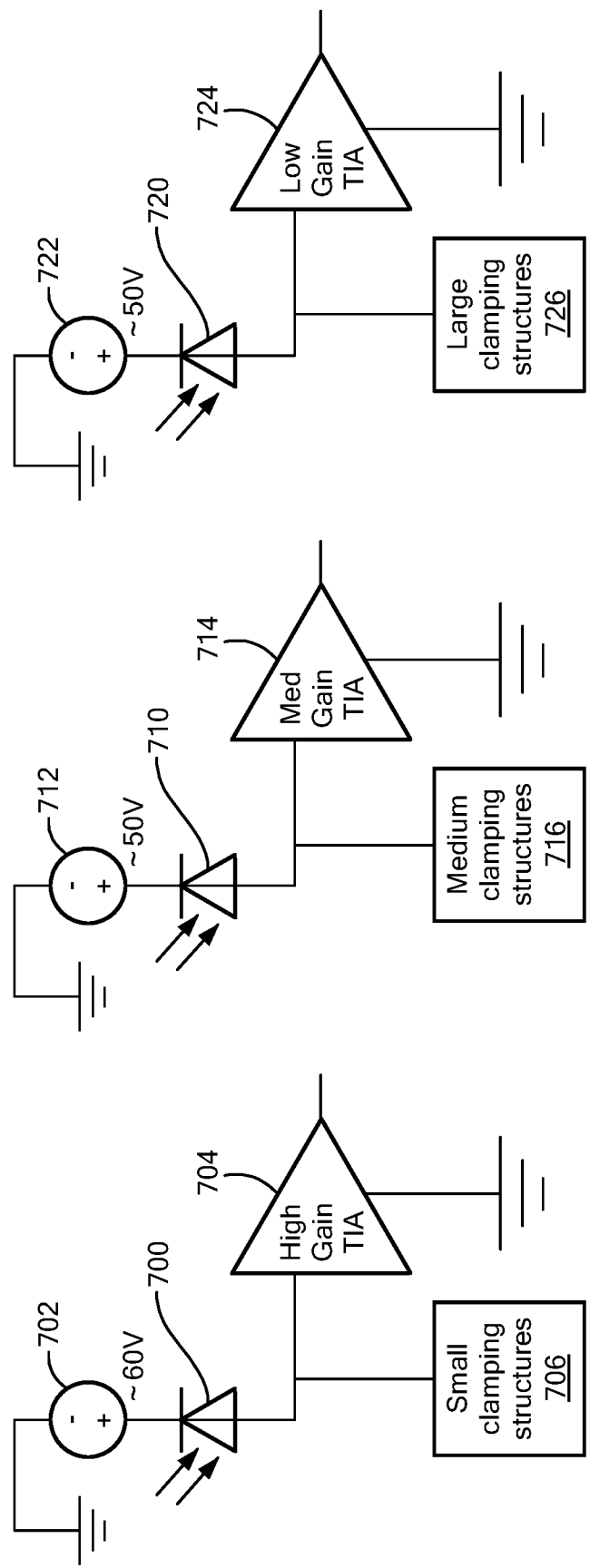

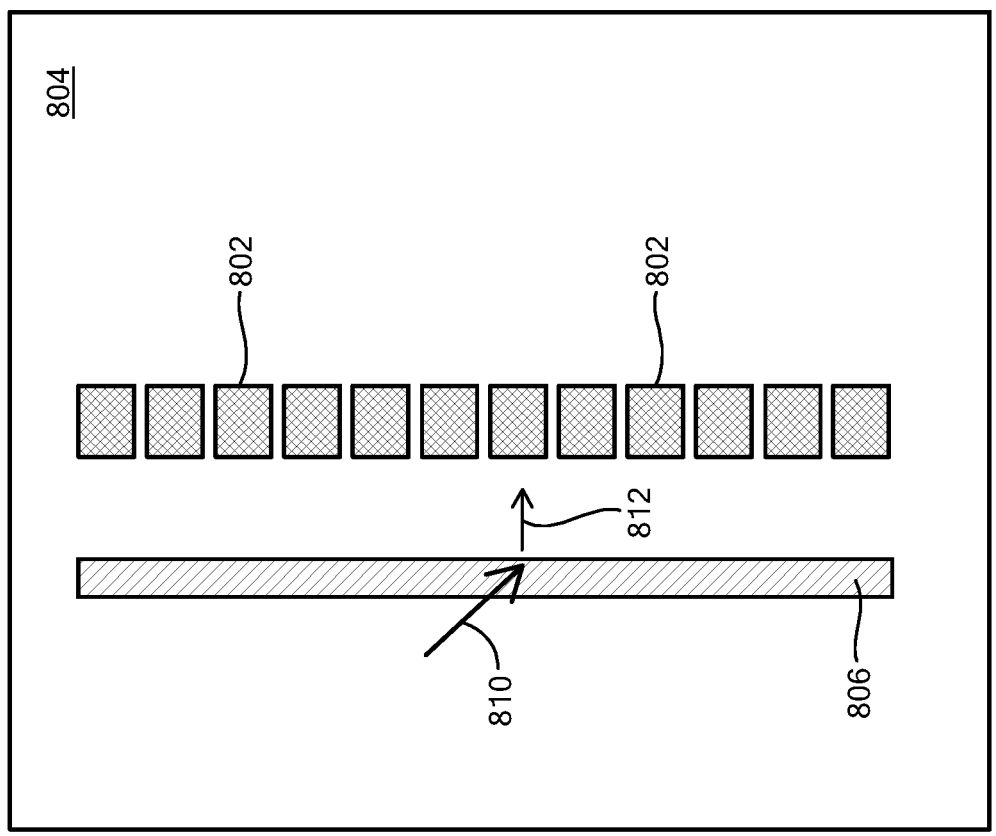
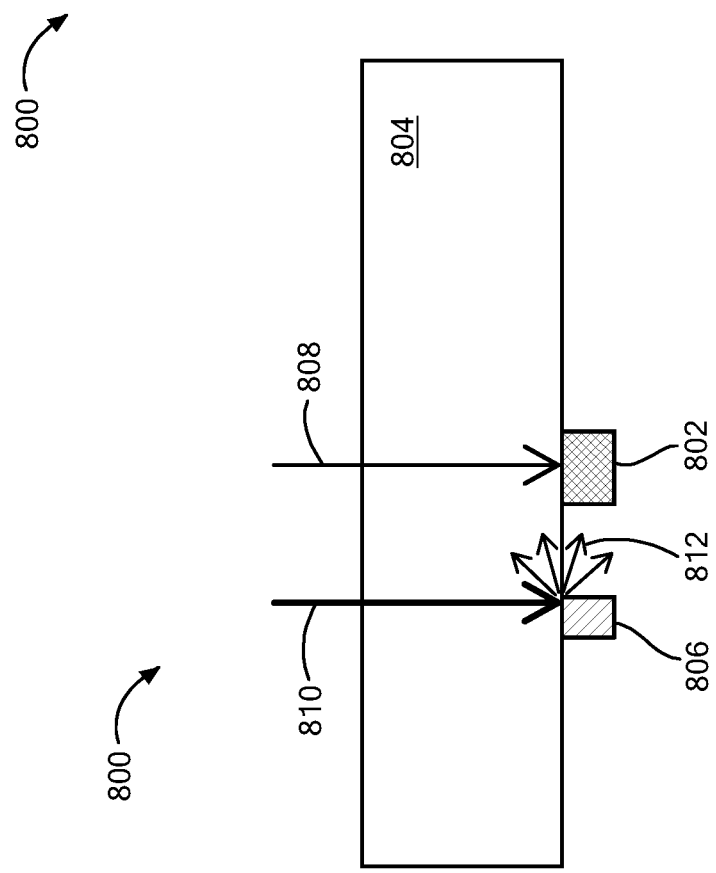
FIG. 8B
FIG. 8A

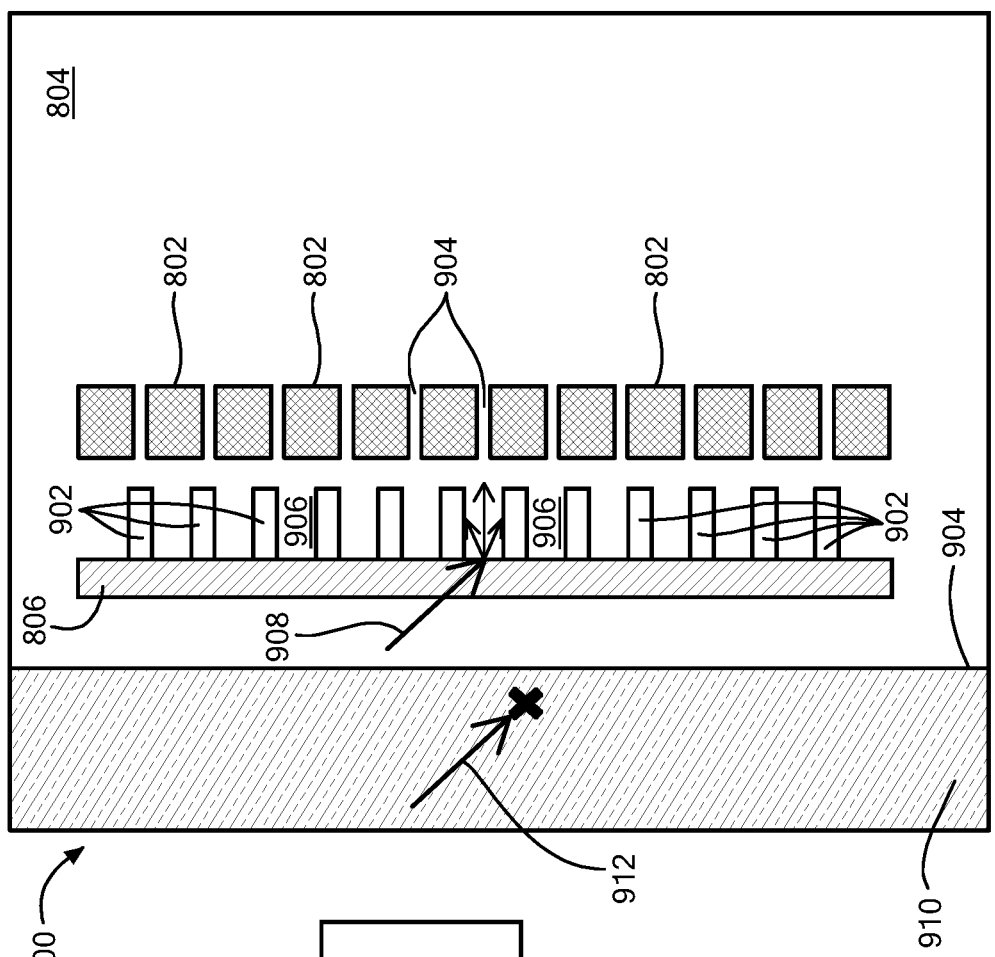
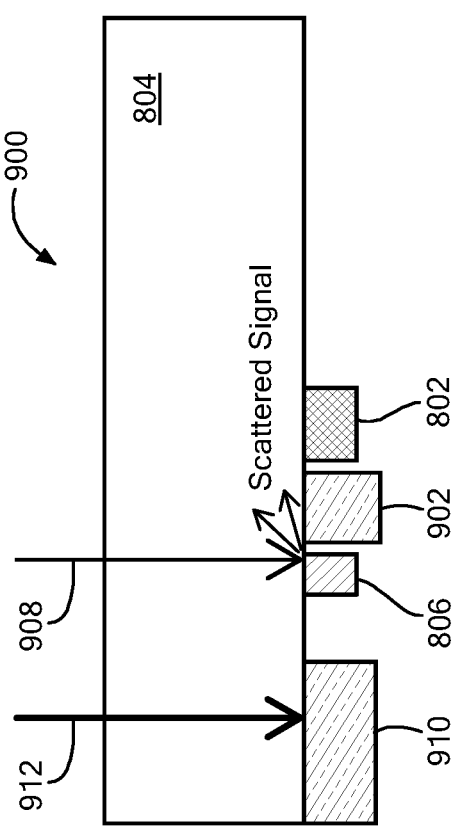
FIG. 9A
FIG. 9B

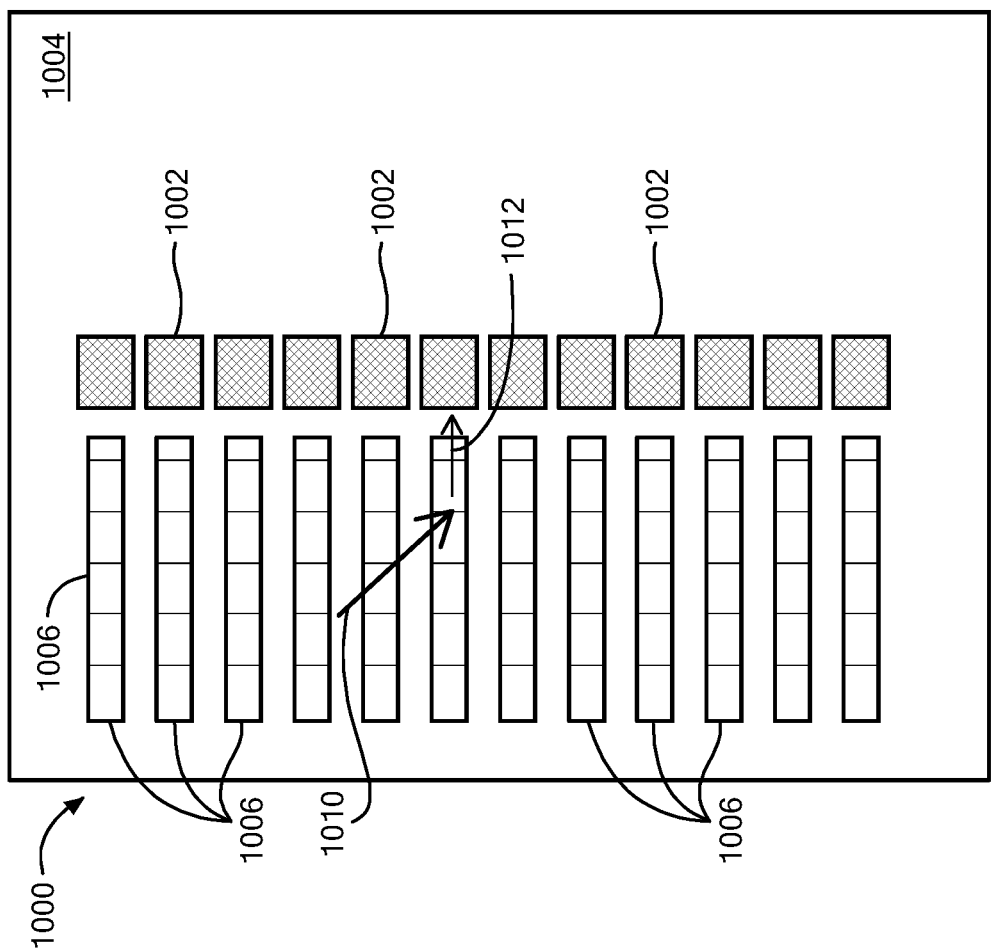
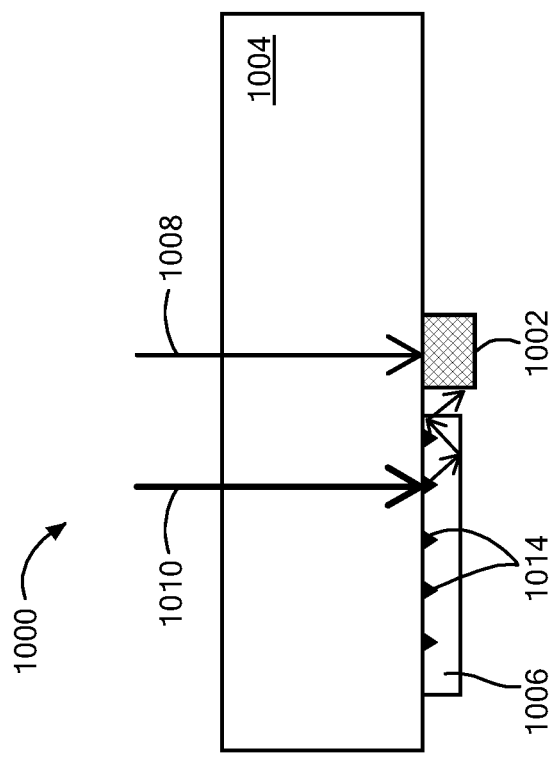
FIG. 10A
FIG. 10B

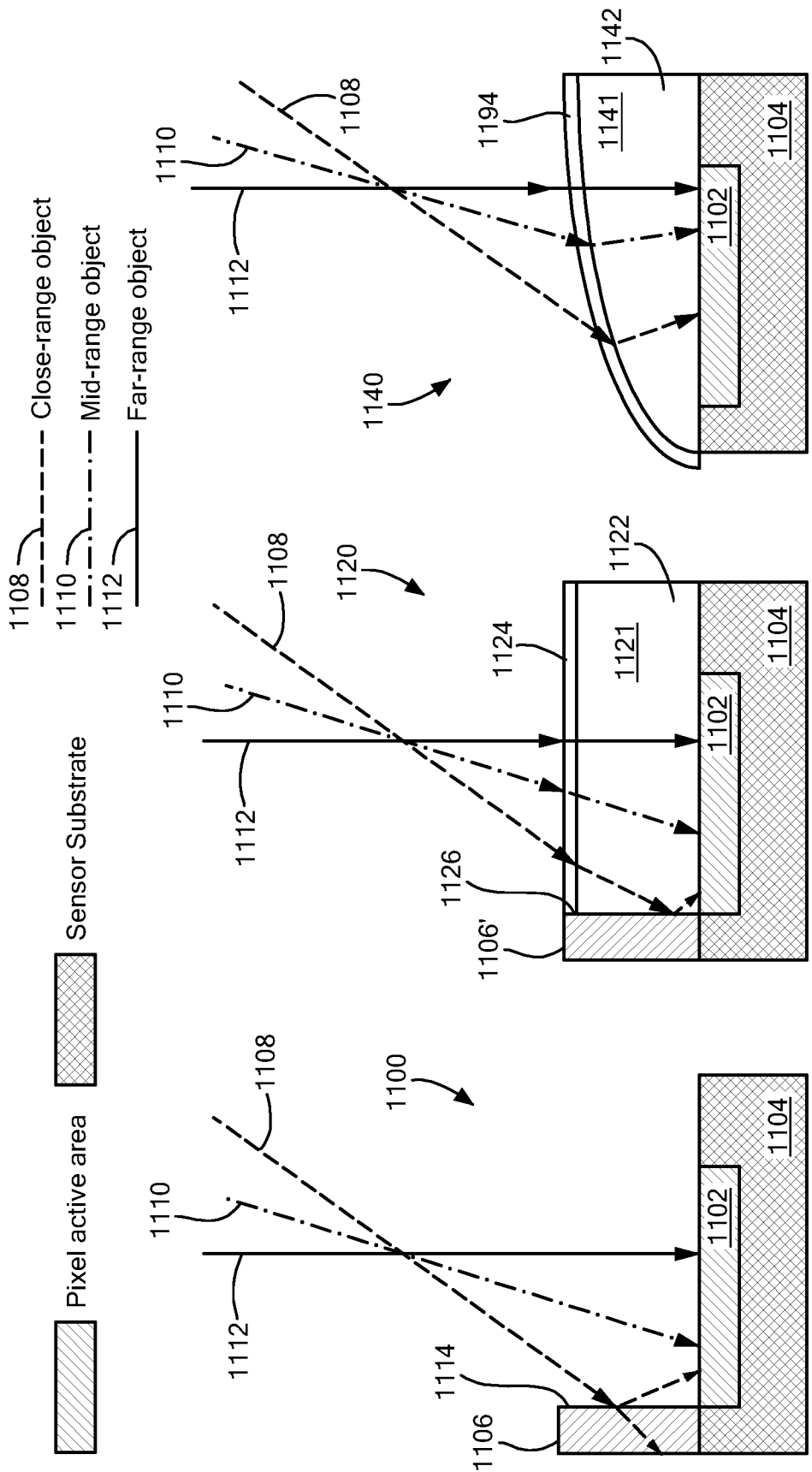

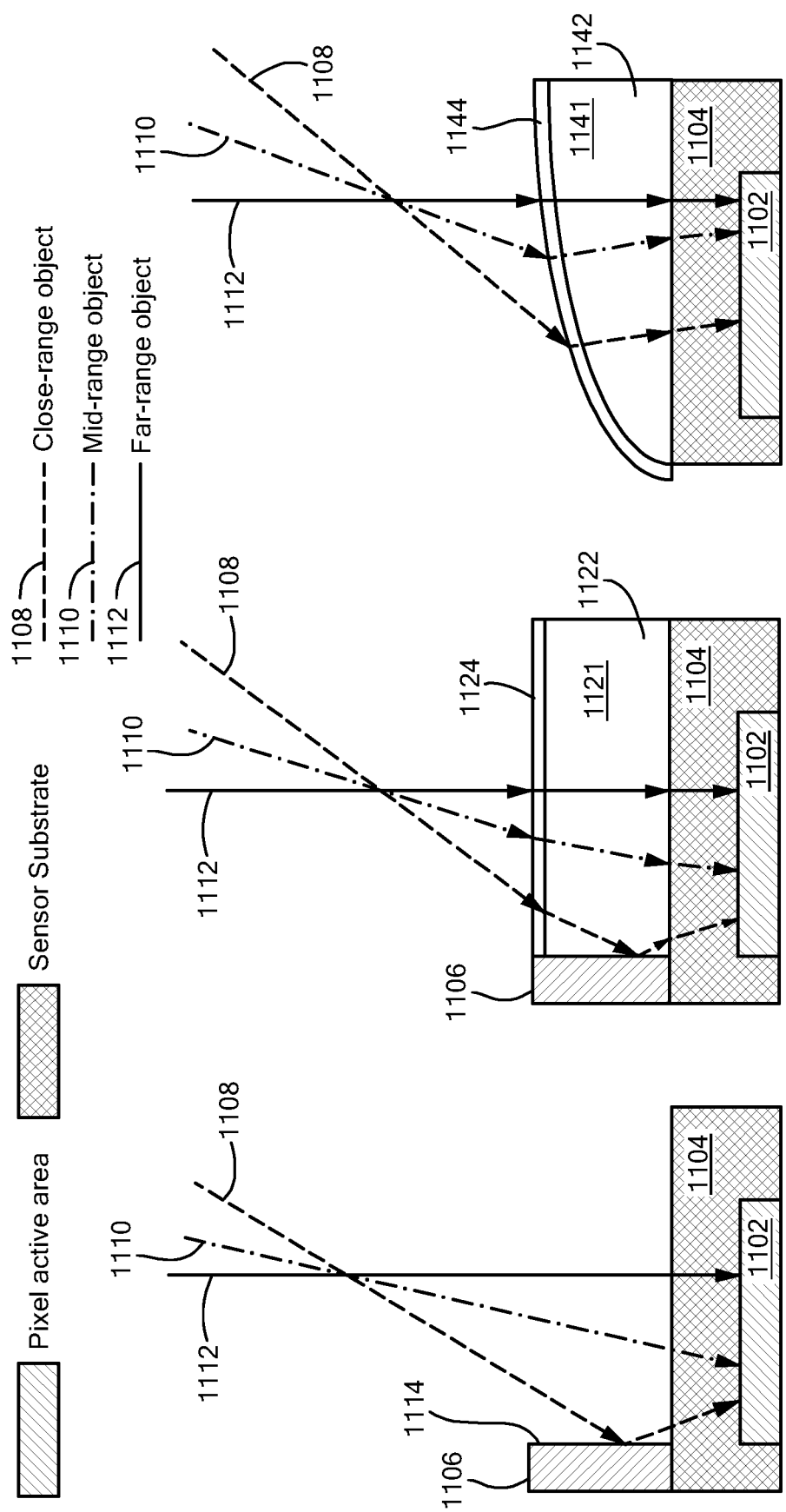

PHOTOSENSOR HAVING RANGE PARALLAX COMPENSATION

BACKGROUND

As is known in the art, in bistatic optical systems there exists a parallax effect where closer objects are imaged off center of objects at infinity. For bistatic lidar systems, this causes a number of issues including that signal returns from closer objects may be imaged completely outside the sensitive area of a detector positioned for returns from infinity thereby rendering the system blind to targets inside a certain range. However, returns from closer objects also tend to be stronger. Signal returns from close objects might be detected even if only a small fraction of the signal return is imaged onto the sensitive area of a detector. Alternatively, strong returns from close objects can also potentially saturate or damage a detector if all of the available energy is received on the sensitive area.

SUMMARY

Embodiments of the disclosure provide methods and apparatus for providing a photodetector system having range parallax compensation. In embodiments, the detector configuration changes based on where on the detector signal returns from different target ranges and/or angles are expected, and on the expectation of different signal return strengths from targets at different ranges. In some embodiments, a system includes a detector having two or more subpixel regions/segments where a first subpixel region handles returns from some distance out to infinity and the other subpixel regions handle other ranges. In embodiments, each subpixel region is configured for the same point in azimuth/elevation but for a different range.

While example embodiments described herein may be shown and described in conjunction with detector arrays having a plurality of pixels, it understood that detector systems may include only a single pixel that can be used with the various features and embodiments described herein.

In some embodiments, an avalanche photodiode (APD) bias of the individual detector subpixel regions can be modified to optimize required optical sensitivity vs. dynamic range and/or damage threshold. Receiver amplifier circuitry can be customized for each subpixel region, such as through adjustment of the amplifier gain and large signal clamping, to optimize the subpixel region optical sensitivity vs. dynamic range and/or damage threshold.

In embodiments, optical reflection or waveguiding structures on the detector can be used to scatter or guide light to the sensitive area of the detector. The scattering efficiency or waveguide coupling efficiency will typically be relatively low, such that only a fraction of the incident energy is conveyed to the detector active area. In this way, an attenuated portion of a strong signal that is not directly imaged onto the detector's sensitive area can be detected. This preserves the sensor's ability to detect close objects while helping to prevent saturation or damage from optical overload and avoid the complexity of providing additional circuit channels for the segmented array approach. Attenuation of the scattered or waveguided signal may also limit the increase of shot noise from optical background associated with effectively increasing the sensor's field-of-view.

In embodiments, a ridge or set of ridges can be formed, e.g., etched into or deposited on, the detector surface, in the optical element to scatter light into the detector's sensitive area. In a linear (1D) detector array, the ridge or ridges may run parallel to the axis of the array. In some embodiments, opaque materials can be used, such as in inactive areas of the detector thin film itself or an epoxy with opaque pigment, and positioned to block unwanted scattering or waveguiding that might otherwise cause crosstalk between different pixels of a multi-element detector array, or inadvertent detection of unwanted returns from objects outside the sensor's intended field-of-view or intended range.

In other embodiments, the optical element used to guide light into the detector's sensitive area comprises a rib waveguide with an end aligned to the detector's sensitive area, and "tapped" along its length with structures that couple light incident on the detector into the waveguide. In a linear (1D) detector array, each pixel has at least one (for a one-side design) rib waveguide running normal to the axis of the array.

In embodiments, a system includes a ROIC and a circuit that correlates adjacent returns noting that when a return has neighboring pixels with a more gaussian decay, that this may be the result of scatter from a narrower return. Various criterion can be used to decide when a return is legitimately broader or the result of adjacent scatter.

In some embodiments, a system is configured to optically redirect off-centered return signal onto the sensitive area of the sensor pixel, as well as temper the signal strength, for imaging close-range objects which would normally be missed by the detector. In some embodiments, a system includes a mirrored surface along the edge of the sensor pixel where the off-centered return signal is expected, oriented perpendicular to the sensor's active area. This mirrored surface collects and reflects the off-center return signals arriving at the detector back towards the pixel's sensitive area. The transmission coefficient of the mirrored surface can be adjusted to ensure that the reflected signal is within the damage threshold limits of the sensor pixel.

In embodiments, a system can include a polished metallic surface on the side of a glass window used during sensor packaging to reflect the off-centered return signal from close objects back to the sensor pixel's sensitive area. This metallic surface may be located along the edge of the sensor pixel where the close-range return is expected and be oriented perpendicular to the pixel's sensitive area. Since the off-center return signals are also stronger, a gradient neutral density coating can be deposited on the glass window such that only a portion of the off-center signals reaches the sensitive area after reflection.

In other embodiments, a system can include a microlens array on top of the sensor where the micro lenses can bend the off-center light arriving at higher angles, e.g., from close objects such that they are imaged onto the sensor instead of being missed. To prevent any pixel damage due to the strong off-center return signals, a gradient neutral density coating can be applied on the microlens array.

In one aspect of the disclosure, a photoreceiver comprises: a plurality of light-sensitive pixels to transduce light to electrical signals, wherein at least a first one of the pixels includes a first subpixel region having a first light response characteristic and a second subpixel region having a second light response characteristic, wherein the first and second light response characteristics are configured to correspond to variations in intensity of reflected light from objects at different distances when apportionment between the first and second subpixel regions of the reflected light reaching the first one of the pixels changes with a range of the objects.

A photoreceiver can further include one or more of the following features: the first subpixel region has a dimension less than a corresponding dimension of the second subpixel region, the first subpixel region is biased at a higher voltage than the second subpixel region, the first subpixel region has a surface area that is less than a surface area of the second subpixel region, a first circuit for the first subpixel region comprising a first photodiode having a first terminal coupled to a first bias voltage and a second terminal coupled to a first amplifier and a first clamping structure, and a second circuit for the second subpixel region comprising a second photodiode having a first terminal coupled to a second bias voltage and a second terminal coupled to a second amplifier and a second clamping structure, the first bias voltage is greater than the second bias voltage, the first amplifier has a higher gain than the second amplifier, the first clamping structure is smaller than the second clamping structure, the photoreceiver comprises a transparent substrate and the photoreceiver further comprises a light scattering structure off axis from the first subpixel region so that at least some light incident on the light scattering structure falls on the first subpixel region, the light scattering structure comprises a ridge, the ridge is positioned to be parallel to a one-dimensional detector array that includes the first subpixel region, a light blocking structure having a series of microstructures forming channels from the light scattering structure to respective ones of detectors in the one-dimensional detector array, the photoreceiver further comprises a transparent substrate and a waveguide to capture light that is incident off the axis of a one-dimensional detector array that includes the first subpixel region, so that at least some light incident on the waveguide falls on the first subpixel region, the waveguide comprises a rib waveguide, the waveguide comprises a series of taps to couple light into the waveguide, a substrate to support the first subpixel region and a reflector extending from the substrate, the reflector having a mirrored surface to reflect light onto the first subpixel region, a substrate to support the first subpixel region, a reflector extending from the substrate, and an optic, wherein the reflector comprises a reflective surface to reflect light onto the first subpixel region, the photoreceiver further comprises a transparent window with a gradient coating to refract light onto the first subpixel region, the photoreceiver further comprises a microlens with a gradient coating to focus received light onto the first subpixel region, the first subpixel region comprises a head portion of a teardrop shape and the second subpixel region comprises a tail portion of the teardrop shape, and/or the photoreceiver further includes a window with a region of increased reflectivity.

In another aspect, a photoreceiver comprises: a single light-sensitive pixel to transduce light to electrical signals, wherein the pixel includes a first subpixel region having a first light response characteristic and a second subpixel region having a second light response characteristic, wherein the first and second light characteristics are configured to correspond to variations in intensity of reflected light from objects at different distances when the portion of the reflected light reaching the pixel is imaged onto the first and second subpixel regions.

A photoreceiver can further include one or more of the following features: the first subpixel region has a dimension less than a corresponding dimension of the second subpixel region, the first subpixel region is biased at a higher voltage than the second subpixel region, the first subpixel region has a surface area that is less than a surface area of the second subpixel region, the photoreceiver comprises a transparent substrate and the photoreceiver further comprises a light scattering structure off axis from the first subpixel region so that at least some light incident on the light scattering structure falls on the first subpixel region, a light blocking structure having a series of microstructures forming channels from the light scattering structure to respective ones of detectors in the one-dimensional detector array, the photoreceiver further comprises a transparent substrate and a waveguide to capture light that is incident off the axis of a one-dimensional detector array that includes the first subpixel region, so that at least some light incident on the waveguide falls on the first subpixel region, a substrate to support the first subpixel region and a reflector extending from the substrate, the reflector having a mirrored surface to reflect light onto the first subpixel region, a substrate to support the first subpixel region, a reflector extending from the substrate, and an optic, wherein the reflector comprises a reflective surface to reflect light onto the first subpixel region, the photoreceiver further comprises a transparent window with a gradient coating to refract light onto the first subpixel region, the photoreceiver further comprises a microlens with a gradient coating to focus received light onto the first subpixel region, the first subpixel region comprises a head portion of a teardrop shape and the second subpixel region comprises a tail portion of the teardrop shape, and/or the photoreceiver further includes a window with a region of increased reflectivity.

In another aspect, a method comprises: transducing light to electrical signals using a light-sensitive pixel in a photoreceiver, wherein the pixel includes a first subpixel region having a first light response characteristic and a second subpixel region having a second light response characteristic, wherein the first and second light characteristics are configured to correspond to variations in intensity of reflected light from objects at different distances when the portion of the reflected light reaching the pixel is imaged onto the first and second subpixel regions.

A method can further include one or more of the following features: the first subpixel region has a dimension less than a dimension of the second subpixel region, the first subpixel region is biased at a higher voltage than the second subpixel region, transducing light to electrical signals using a pixel array, the first subpixel region has a surface area that is less than a surface area of the second subpixel region, the photoreceiver comprises a transparent substrate and the photoreceiver further comprises a light scattering structure off axis from the first subpixel region so that at least some light incident on the light scattering structure falls on the first subpixel region, the photoreceiver further comprises a transparent window with a gradient coating to refract light onto the first subpixel region, the photoreceiver further comprises a microlens with a gradient coating to focus received light onto the first subpixel region, the first subpixel region comprises a head portion of a teardrop shape and the second subpixel region comprises a tail portion of the teardrop shape, and/or the photoreceiver further includes a window with a region of increased reflectivity.

In a further aspect, a system comprises: an optic to receive light from near objects and far objects; a photoreceiver optically coupled to the optic, the photoreceiver including a photodetector array; and a light scattering structure positioned a distance from the photodetector array to compensate for parallax effects for the received energy from the near objects and the far objects, wherein the light scattering structure is configured to scatter light onto pixels of the photodetector array.

A system can further include one or more of the following features: the light scattering structure comprises a ridge, the ridge is positioned to be parallel to the photodetector array, which comprises a one-dimensional detector array, a light blocking structure having a series of teeth positioned in relation to the pixels of the photodetector array to create channels from the light scattering structure to respective pixels of the photodetector array, and/or the system further includes a window with a region of increased reflectivity.

In a further aspect, a system comprises: an optic to receive light from near objects and far objects; a photoreceiver optically coupled to the optic, the photoreceiver including a photodetector array; and at least one waveguide positioned a distance from the photodetector array to compensate for parallax effects for the received energy from the near objects and the far objects, wherein the at least one waveguide is configured to capture light and exit light onto respective pixels of the photodetector array. A system can further include the at least one waveguide comprising a series of taps to capture light.

In a further aspect, a system comprises: a photoreceiver to receive light from near objects and far objects, the photoreceiver including a photodetector array; a substrate to support the photodetector array; and a reflector having a reflective surface positioned a distance from the photodetector array to compensate for parallax effects for the received energy from the near objects and the far objects, wherein the reflector is configured to reflect received energy from the far objects onto respective pixels of the photodetector array. A system can further include a transparent window with a gradient coating to refract and attenuate light onto the respective pixels of the photodetector array.

In a further aspect, a system comprises: a photoreceiver to receive light from near objects and far objects, the photoreceiver including a photodetector array; a substrate to support the photodetector array; and an optic to compensate for parallax effects for the received energy from the near objects and the far objects, wherein the optic comprises a microlens with a gradient coating to focus and attenuate the received energy from the near and far objects onto respective pixels of the photodetector array.

In a further aspect, a system comprises: a laser to transmit light at near objects and far objects within a beam envelope along a principal transmit axis; and an optic to receive light reflected by near objects and far objects within an angular field-of-view along a principal receive axis, wherein the principal receive axis is offset from and substantially parallel to the principal transmit axis, and the angular field-of-view overlaps the laser beam envelope; and a photoreceiver comprising a photodetector array including at least one light-sensitive pixel that transduces light to electrical signals, the photodetector array being optically coupled to the optic such that light transmitted by the laser and reflected back to the system by near and far objects located along the principal transmit axis forms an image of the laser beam envelope on the photodetector array that is sampled by the light-sensitive pixels, and the position of the centroid of the laser beam envelope image varies systematically with the distance from system to object along the principal transmit axis, wherein the at least pixels comprises at least two subpixel regions, wherein each of the subpixel regions of the given pixel is positioned to respond to light reflected by objects at different distances along the principal transmit axis, and each of the subpixel regions is designed to respond differently to light in a way that accounts for the variation of reflected light intensity with object distance, and/or the system further includes a window with a region of increased reflectivity.

In another aspect, a method comprises: employing a receiver including an optic having a transparent substrate to receive light from near objects and far objects; employing a photodetector array optically coupled to the receiver, employing a light scattering structure positioned a distance from the photodetector array to compensate for parallax effects for the received energy from the near objects and the far objects, wherein the light scattering structure is configured to scatter light onto pixels of the photodetector array.

A method can further include one or more of the following features: the light scattering structure comprises a ridge, the ridge is positioned to be parallel to the photodetector array, which comprises a one-dimensional detector array, and/or employing a light blocking structure having a series of teeth positioned in relation to the pixels of the photodetector array to create channels from the light scattering structure to respective pixels of the photodetector array.

In a further aspect, a method comprises: employing an optic to receive light from near objects and far objects; employing a photoreceiver optically coupled to the optic, the photoreceiver including a photodetector array; and employing at least one waveguide positioned a distance from the photodetector array to compensate for parallax effects for the received energy from the near objects and the far objects, wherein the at least one waveguide is configured to capture light and exit light onto respective pixels of the photodetector array. A method can further include the at least one waveguide comprises a series of taps to capture light.

In a further aspect, a method comprises: employing an optic to receive light from near objects and far objects; employing a photoreceiver optically coupled to the optic, the photoreceiver including a photodetector array; and employing a substrate to support the photodetector array; and employing a reflector having a reflective surface positioned a distance from the photodetector array to compensate for parallax effects for the received energy from the near objects and the far objects, wherein the reflector is configured to reflect received energy from the far objects onto respective pixels of the photodetector array. A method can further include a transparent window with a gradient coating to refract and attenuate light onto the respective pixels of the photodetector array.

In a further aspect, a method comprises: employing an optic to receive light from near objects and far objects; employing a photoreceiver optically coupled to the optic, the photoreceiver including a photodetector array; and employing a substrate to support the photodetector array; and employing an optic to compensate for parallax effects for the received energy from the near objects and the far objects, wherein the optic comprises a microlens with a gradient coating to focus and attenuate the received energy from the near and far objects onto respective pixels of the photodetector array.

In a further aspect, a method comprises: employing a laser to transmit light at near objects and far objects within a beam envelope along a principal transmit axis; and employing an optic to receive light reflected by near objects and far objects within an angular field-of-view along a principal receive axis, wherein the principal receive axis is offset from and substantially parallel to the principal transmit axis, and the angular field-of-view overlaps the laser beam envelope; and employing a photoreceiver comprising a photodetector array including at least one light-sensitive pixel that transduce light to electrical signals, the photodetector array being optically coupled to the optic such that light transmitted by the laser and reflected back to the system by near and far objects located along the principal transmit axis forms an image of the laser beam envelope on the photodetector array that is sampled by the light-sensitive pixels, and the position of the centroid of the laser beam envelope image varies systematically with the distance from system to object along the principal transmit axis, wherein at least one of the pixels comprises at least two subpixel regions, wherein each of the subpixel regions of the given pixel is positioned to respond to light reflected by objects at different distances along the principal transmit axis, and each of the subpixel regions is designed to respond differently to light in a way that accounts for the variation of reflected light intensity with object distance. A method can further include employing a window with a region of increased reflectivity.

BRIEF DESCRIPTION OF THE DRAWINGS

The foregoing features of this disclosure, as well as the disclosure itself, may be more fully understood from the following description of the drawings in which:

FIGS. 7A, 7B, and 7C are circuit diagrams that may be used for the pixel segmentation shown in FIGS. 6 and 6A;

FIG. 8A is a cross-sectional view and FIG. 8B is a top view of a detection system having a light scattering feature;

FIG. 9A is a top view and FIG. 9B is a cross-sectional view of a detection system having a light scattering feature and light blocking feature;

FIG. 10A is a top view and FIG. 10B is a cross-sectional view of a detection system having a waveguide;

FIG. 11A is a schematic representation of a detector system having a light reflecting feature for close-range object signal return and FIG. 11D is a backside configuration of the system of FIG. 11A;

FIG. 11B is a schematic representation of a detector system having an optic to refract light and a light reflecting feature for close-range object signal return and FIG. 11E is a backside configuration of the system of FIG. 11B;

FIG. 11C is a schematic representation of a detector system having a lens to focus light a photosensitive area and FIG. 11F is a backside configuration of the system of FIG. 11C;

DETAILED DESCRIPTION

Figure 1:
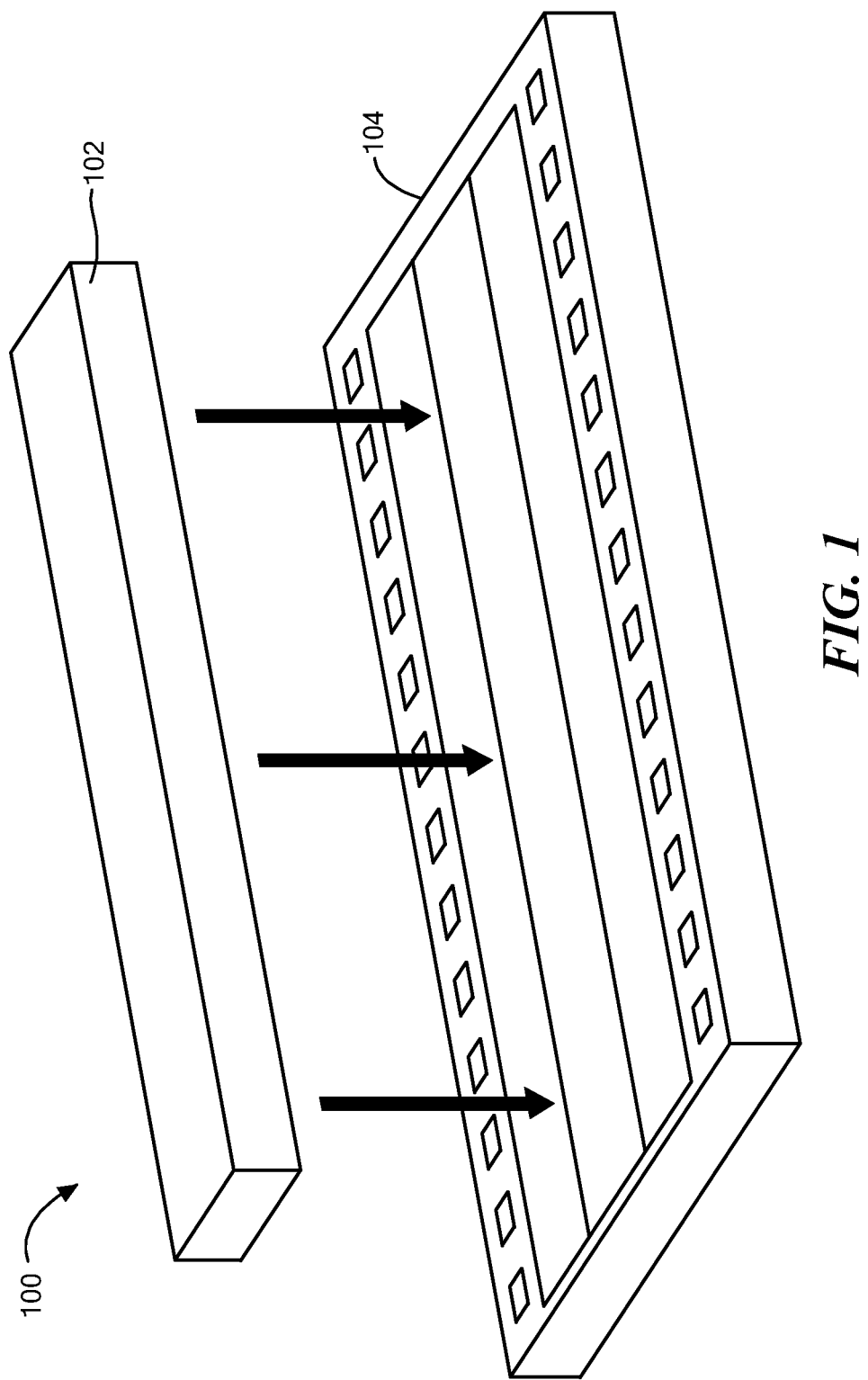
FIG. 1 is a partially exploded photonic sensor having parallax compensation in accordance with example embodiments of the disclosure.

Prior to describing example embodiments of the disclosure some information is provided. Laser ranging systems can include laser radar (ladar), light-detection and ranging (lidar), and rangefinding systems, which are generic terms for the same class of instrument that uses light to measure the distance to objects in a scene. This concept is similar to radar, except optical signals are used instead of radio waves. Similar to radar, a laser ranging and imaging system emits a pulse toward a particular location and measures the return echoes to extract the range.

As used herein, the term "light" refers to electromagnetic radiation spanning the ultraviolet, visible, and infrared wavebands, of any wavelength between 100 nm and 3,000 nm.

Laser ranging systems generally work by emitting a laser pulse and recording the time it takes for the laser pulse to travel to a target, reflect, and return to a photoreceiver. The laser ranging instrument records the time of the outgoing pulse—either from a trigger or from calculations that use measurements of the scatter from the outgoing laser light—and then records the time that a laser pulse returns. The difference between these two times is the time of flight to and from the target. Using the speed of light, the round-trip time of the pulses is used to calculate the distance to the target.

Lidar systems may scan the beam across a target area to measure the distance to multiple points across the field of view, producing a full three-dimensional range profile of the surroundings. More advanced flash lidar cameras, for example, contain an array of detector elements, each able to record the time of flight to objects in their field of view.

When using light pulses to create images, the emitted pulse may intercept multiple objects, at different orientations, as the pulse traverses a 3D volume of space. The echoed laser-pulse waveform contains a temporal and amplitude imprint of the scene. By sampling the light echoes, a record of the interactions of the emitted pulse is extracted with the intercepted objects of the scene, allowing an accurate multi-dimensional image to be created. To simplify signal processing and reduce data storage, laser ranging and imaging can be dedicated to discrete-return systems, which record only the time of flight (TOF) of the first, or a few, individual target returns to obtain angle-angle-range images. In a discrete-return system, each recorded return corresponds, in principle, to an individual laser reflection (i.e., an echo from one particular reflecting surface, for example, a tree, pole or building). By recording just a few individual ranges, discrete-return systems simplify signal processing and reduce data storage, but they do so at the expense of lost target and scene reflectivity data. Because laser-pulse energy has significant associated costs and drives system size and weight, recording the TOF and pulse amplitude of more than one laser pulse return per transmitted pulse, to obtain angle-angle-range-intensity images, increases the amount of captured information per unit of pulse energy. All other things equal, capturing the full pulse return waveform offers significant advantages, such that the maximum data is extracted from the investment in average laser power. In full-waveform systems, each backscattered laser pulse received by the system is digitized at a high sampling rate (e.g., 500 MHz to 1.5 GHZ). This process generates digitized waveforms (amplitude versus time) that may be processed to achieve higher-fidelity 3D images.

Of the various laser ranging instruments available, those with single-element photoreceivers generally obtain range data along a single range vector, at a fixed pointing angle. This type of instrument—which is, for example, commonly used by golfers and hunters-either obtains the range (R) to one or more targets along a single pointing angle or obtains the range and reflected pulse intensity (I) of one or more objects along a single pointing angle, resulting in the collection of pulse range-intensity data, $(R,I)_i$, where i indicates the number of pulse returns captured for each outgoing laser pulse.

More generally, laser ranging instruments can collect ranging data over a portion of the solid angles of a sphere, defined by two angular coordinates (e.g., azimuth and elevation), which can be calibrated to three-dimensional (3D) rectilinear cartesian coordinate grids; these systems are generally referred to as 3D lidar and ladar instruments. The terms "lidar" and "ladar" are often used synonymously and, for the purposes of this discussion, the terms "3D lidar," "scanned lidar," or "lidar" are used to refer to these systems without loss of generality. 3D lidar instruments obtain three-dimensional (e.g., angle, angle, range) data sets. Conceptually, this would be equivalent to using a rangefinder and scanning it across a scene, capturing the range of objects in the scene to create a multi-dimensional image. When only the range is captured from the return laser pulses, these instruments obtain a 3D data set (e.g., angle, angle, range) n, where the index n is used to reflect that a series of range-resolved laser pulse returns can be collected, not just the first reflection.

Some 3D lidar instruments are also capable of collecting the intensity of the reflected pulse returns generated by the objects located at the resolved (angle, angle, range) objects in the scene. When both the range and intensity are recorded, a multi-dimensional data set [e.g., angle, angle, (range-intensity)] is obtained. This is analogous to a video camera in which, for each instantaneous field of view (FOV), each effective camera pixel captures both the color and intensity of the scene observed through the lens. However, 3D lidar systems, instead capture the range to the object and the reflected pulse intensity.

Lidar systems can include different types of lasers, including those operating at different wavelengths, including those that are not visible (e.g., those operating at a wavelength of 840 nm or 905 nm), and in the near-infrared (e.g., those operating at a wavelength of 1064 nm or 1550 nm), and the thermal infrared including those operating at wavelengths known as the "eyesafe" spectral region (i.e., generally those operating at a wavelength beyond 1300-nm), where ocular damage is less likely to occur. Lidar transmitters are generally invisible to the human eye. However, when the wavelength of the laser is close to the range of sensitivity of the human eye—roughly 350 nm to 730 nm—the energy of the laser pulse and/or the average power of the laser must be lowered such that the laser operates at a wavelength to which the human eye is not sensitive. Thus, a laser operating at, for example, 1550 nm, can—without causing ocular damage—generally have 200 times to 1 million times more laser pulse energy than a laser operating at 840 nm or 905 nm.

One challenge for a lidar system is detecting poorly reflective objects at long distance, which requires transmitting a laser pulse with enough energy that the return signal—reflected from the distant target—is of sufficient magnitude to be detected. To determine the minimum required laser transmission power, several factors must be considered. For instance, the magnitude of the pulse returns scattering from the diffuse objects in a scene is proportional to their range and the intensity of the return pulses generally scales with distance according to $1/R^4$ for small objects and $1/R^2$ for larger objects; yet, for highly-specularly reflecting objects (i.e., those objects that are not diffusively-scattering objects), the collimated laser beams can be directly reflected back, largely unattenuated. This means that—if the laser pulse is transmitted, then reflected from a target 1 meter away—it is possible that the full energy (J) from the laser pulse will be reflected into the photoreceiver; but—if the laser pulse is transmitted, then reflected from a target 333 meters away—it is possible that the return will have a pulse with energy approximately $10^{12}$ weaker than the transmitted energy. To provide an indication of the magnitude of this scale, the 12 orders of magnitude ($10^{12}$) is roughly the equivalent of: the number of inches from the earth to the sun, 10× the number of seconds that have elapsed since Cleopatra was born, or the ratio of the luminous output from a phosphorescent watch dial, one hour in the dark, to the luminous output of the solar disk at noon.

In many cases of lidar systems highly-sensitive photoreceivers are used to increase the system sensitivity to reduce the amount of laser pulse energy that is needed to reach poorly reflective targets at the longest distances required, and to maintain eyesafe operation. Some variants of these detectors include those that incorporate photodiodes, and/or offer gain, such as avalanche photodiodes (APDs) or single-photon avalanche detectors (SPADs). These variants can be configured as single-element detectors, segmented-detectors, linear detector arrays, or area detector arrays. Using highly sensitive detectors such as APDs or SPADs reduces the amount of laser pulse energy required for long-distance ranging to poorly reflective targets. The technological challenge of these photodetectors is that they must also be able to accommodate the incredibly large dynamic range of signal amplitudes.

As dictated by the properties of the optics, the focus of a laser return changes as a function of range; as a result, near objects are often out of focus. Furthermore, also as dictated by the properties of the optics, the location and size of the "blur"—i.e., the spatial extent of the optical signal—changes as a function of range, much like in a standard camera. These challenges are commonly addressed by using large detectors, segmented detectors, or multi-element detectors to capture all of the light or just a portion of the light over the full-distance range of objects. It is generally advisable to design the optics such that reflections from close objects are blurred, so that a portion of the optical energy does not reach the detector or is spread between multiple detectors. This design strategy reduces the dynamic range requirements of the detector and prevents the detector from damage.

Acquisition of the lidar imagery can include, for example, a 3D lidar system embedded in the front of car, where the 3D lidar system, includes a laser transmitter with any necessary optics, a single-element photoreceiver with any necessary dedicated or shared optics, and an optical scanner used to scan ("paint") the laser over the scene. Generating a full-frame 3D lidar range image—where the field of view is 20 degrees by 60 degrees and the angular resolution is 0.1 degrees (10 samples per degree)—requires emitting 120,000 pulses [(20*10*60*10)=120,000)]. When update rates of 30 frames per second are required, such as is required for automotive lidar, roughly 3.6 million pulses per second must be generated and their returns captured.

There are many ways to combine and configure the elements of the lidar system-including considerations for the laser pulse energy, beam divergence, detector array size and array format (single element, linear, 2D array), and scanner to obtain a 3D image. If higher power lasers are deployed, pixelated detector arrays can be used, in which case the divergence of the laser would be mapped to a wider field of view relative to that of the detector array, and the laser pulse energy would need to be increased to match the proportionally larger field of view. For example—compared to the 3D lidar above—to obtain same-resolution 3D lidar images 30 times per second, a 120,000-element detector array (e.g., 200×600 elements) could be used with a laser that has pulse energy that is 120,000 times greater. The advantage of this "flash lidar" system is that it does not require an optical scanner; the disadvantages are that the larger laser results in a larger, heavier system that consumes more power, and that it is possible that the required higher pulse energy of the laser will be capable of causing ocular damage. The maximum average laser power and maximum pulse energy are limited by the requirement for the system to be eyesafe.

As noted above, while many lidar system operate by recording only the laser time of flight and using that data to obtain the distance to the first target return (closest) target, some lidar systems are capable of capturing both the range and intensity of one or multiple target returns created from each laser pulse. For example, for a lidar system that is capable of recording multiple laser pulse returns, the system can detect and record the range and intensity of multiple returns from a single transmitted pulse. In such a multi-pulse lidar system, the range and intensity of a return pulse from a from a closer-by object can be recorded, as well as the range and intensity of later reflection(s) of that pulse—one (s) that moved past the closer-by object and later reflected off of more-distant object(s). Similarly, if glint from the sun reflecting from dust in the air or another laser pulse is detected and mistakenly recorded, a multi-pulse lidar system allows for the return from the actual targets in the field of view to still be obtained.

The amplitude of the pulse return is primarily dependent on the specular and diffuse reflectivity of the target, the size of the target, and the orientation of the target. Laser returns from close, highly-reflective objects, are many orders of magnitude greater in intensity than the intensity of returns from distant targets. Many lidar systems require highly sensitive photodetectors, for example avalanche photodiodes (APDs), which along with their CMOS amplification circuits. So that distant, poorly-reflective targets may be detected, the photoreceiver components are optimized for high conversion gain. Largely because of their high sensitivity, these detectors may be damaged by very intense laser pulse returns.

For example, if an automotive equipped with a front-end lidar system were to pull up behind another car at a stoplight, the reflection off of the license plate may be significant—perhaps 10^12 higher than the pulse returns from targets at the distance limits of the lidar system. When a bright laser pulse is incident on the photoreceiver, the large current flow through the photodetector can damage the detector, or the large currents from the photodetector can cause the voltage to exceed the rated limits of the CMOS electronic amplification circuits, causing damage. For this reason, it is generally advisable to design the optics such that the reflections from close objects are blurred, so that a portion of the optical energy does not reach the detector or is spread between multiple detectors.

However, capturing the intensity of pulses over a larger dynamic range associated with laser ranging may be challenging because the signals are too large to capture directly. One can infer the intensity by using a recording of a bit-modulated output obtained using serial-bit encoding obtained from one or more voltage threshold levels. This technique is often referred to as time-over-threshold (TOT) recording or, when multiple-thresholds are used, multiple time-over-threshold (MTOT) recording.

FIG. 1 shows an example sensor 100 having a linear mode avalanche photodetector (APD) array 102 and a readout integrated circuit (ROIC) 104 with range-based parallax compensation in accordance with example embodiments of the disclosure. In some embodiments, the sensor 100 may comprise a time-of-flight (ToF) sensor for receiving light energy from a remote source or target. As described more fully below, in example embodiments, the detector configuration changes to accommodate various distances of an object that reflects transmitted energy.

Figure 2:
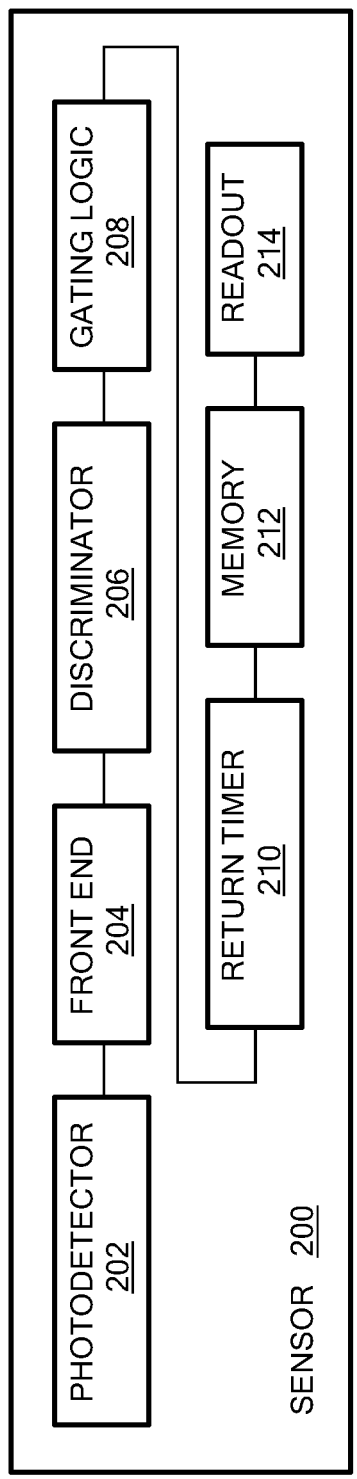
FIG. 2 is a block diagram of an example time-of-flight sensor having parallax compensation in accordance with example embodiments of the disclosure.

FIG. 2 shows an example LIDAR time-of-flight sensor 200 having photodetectors including a photodiode 202 array to detect photons reflected from a target illuminated with transmitted energy. A front-end circuit 204, which may include an amplifier for example, receives a current pulse generated by an optical pulse on the photodiode 202 and converts the current signal into an output, for example, an output voltage pulse. A discriminator circuit 206, such as a voltage discriminator, can determine if the current pulse, or its representation after signal conversion by the front-end circuit, is above one or more thresholds. Gating logic 208 receives an output from the discriminator 206 to match received signals with transmitted signals, for example. A return timer circuit 210, which can include a time-to-digital converter (TDC) for generating time-stamps, can determine the time from signal transmission to signal return so that a distance from the sensor to the target can be determined based on so-called time of flight. A memory 212 can store signal information, such as time of flight, time over threshold, and the like. A readout circuit 214-enables information to be read from the sensor.

A data processing and calibration circuit 213 may be inserted between the memories 212 and the readout 214 which may perform any number of data correction or mapping functions. For example, the circuit may compare timing return information to timing reference information and convert timing return information into specific range information. Additionally, the circuit may correct for static or dynamic errors using calibration and correction algorithms. Other possible functions include noise reduction based on multi-return data or spatial correlation or objection detection. A possible mapping function may be to reshape the data into point-cloud data or to include additional probability data of correct measurement values based on additionally collected information from the sensor.

Figure 2A:
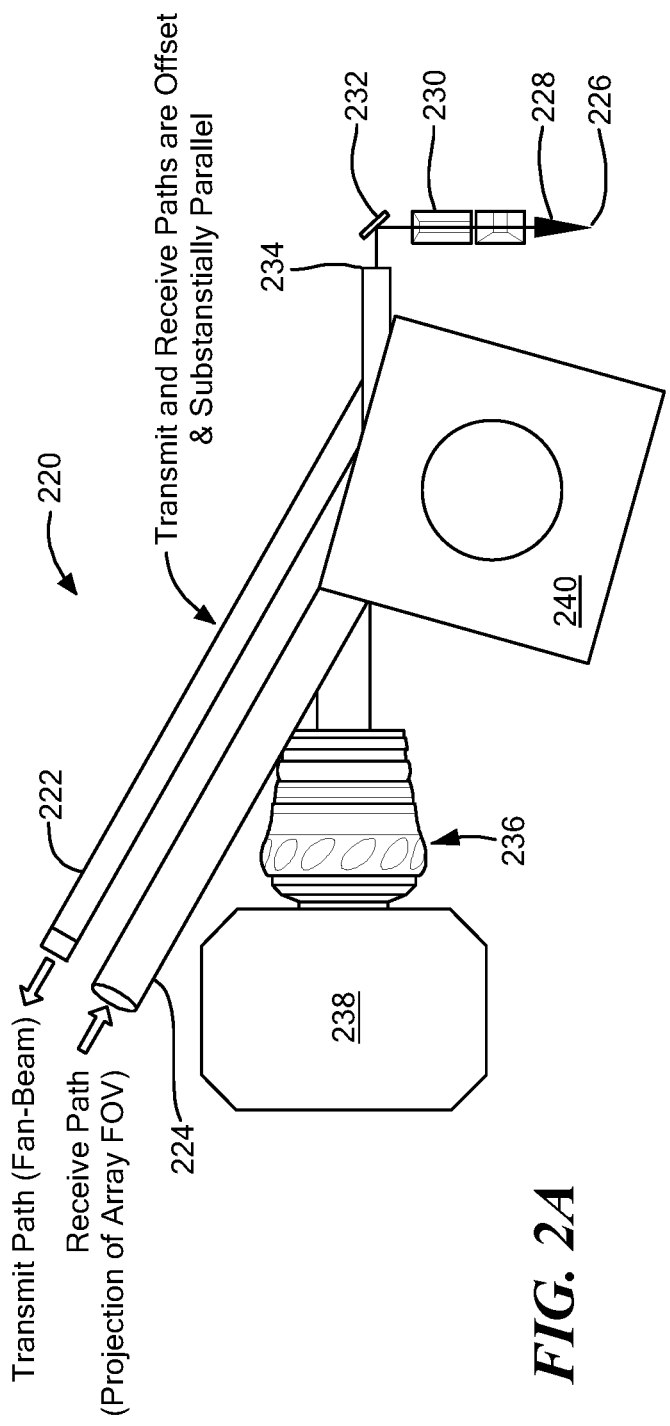
FIG. 2A is a schematic representation of an example bistatic 1D lidar scanner having parallax compensation in accordance with example embodiments of the disclosure.

FIG. 2A shows an example bistatic lidar scanner system 220 having parallax compensation in accordance with illustrative embodiments of the disclosure. The transmit path 222 is the actual laser beam and the receive path 224 represents a projection of the receiver array's field-of-view (FOV) back through the optics. In other words, assume reversing all the light rays that can reach any portion of the array's active area and trace them back through the sensor's lens to get a projection of the array's FOV onto the scene.

The illustrative system 220 includes a fiber laser input 226, collimating lens 228, prism pair 230, fold mirror 232 and diffractive optical element 234, which generates a fan beam, coupled in series. On the receive side, an image-forming lens 236 is disposed in front of the receiver 238, which includes a detector array (not shown). A mirror 240, such as a spinning polygon mirror 242 can select the transmit/receive path.

The centers of the transmit and receive paths 222, 224 are offset and substantially parallel which may generate a range-parallax effect addressed by example embodiments of the disclosure. The scanner 220 preserves the ordering of the receive and transmit paths 222, 224 in the direction of their offset. In the illustrated embodiment, the receive path 224 is always to the left of the transmit path 222. As described more fully below, pixel configurations in the detector array can taper, or otherwise change in their characteristics, to one side of the array axis. In other embodiments, scanning systems a direction of range-parallax effect may be to both sides of the array axis. Folding mirrors, which preserve parallelism, may be used to meet the needs of a particular application.

Figure 2B:
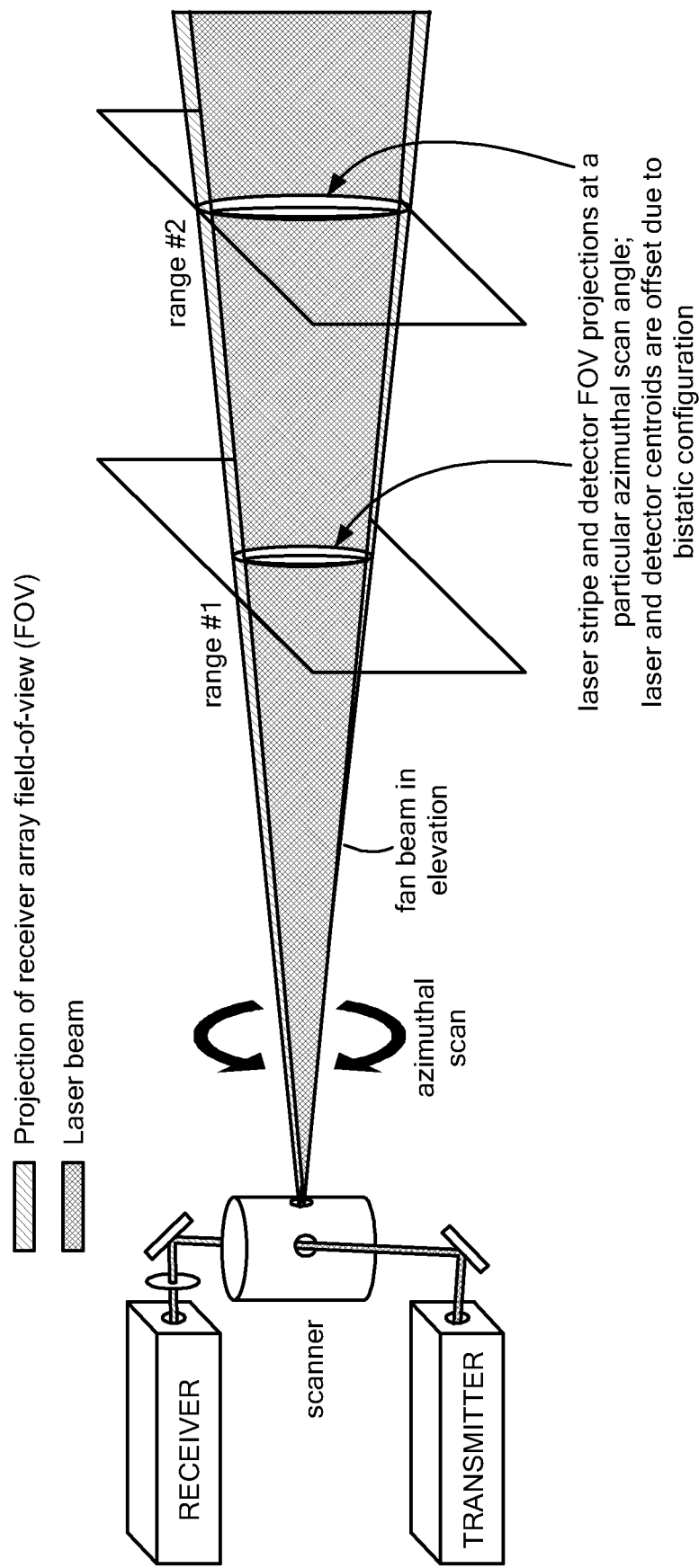
FIG. 2B is a schematic representation of an example bistatic 1D scanned lidar system having parallax compensation in accordance with example embodiments of the disclosure.

FIG. 2B shows an example 1D scanned lidar system having parallax compensation in accordance with illustrative embodiments of the disclosure. As can be seen, centroids of the laser fan-beam and the projection of the receiver's FOV are offset. The receiver's FOV has to overlap the fan-beam in order to see the projected laser stripe. It is understood that the object is not seen unless the laser paints the object with a stripe, and that stripe is directly in the straight beam path of the laser. Thus, the offset and substantial parallelism of the transmit and receive paths is a geometric characteristic of this type of 1D scanned lidar system.

Figure 2C:
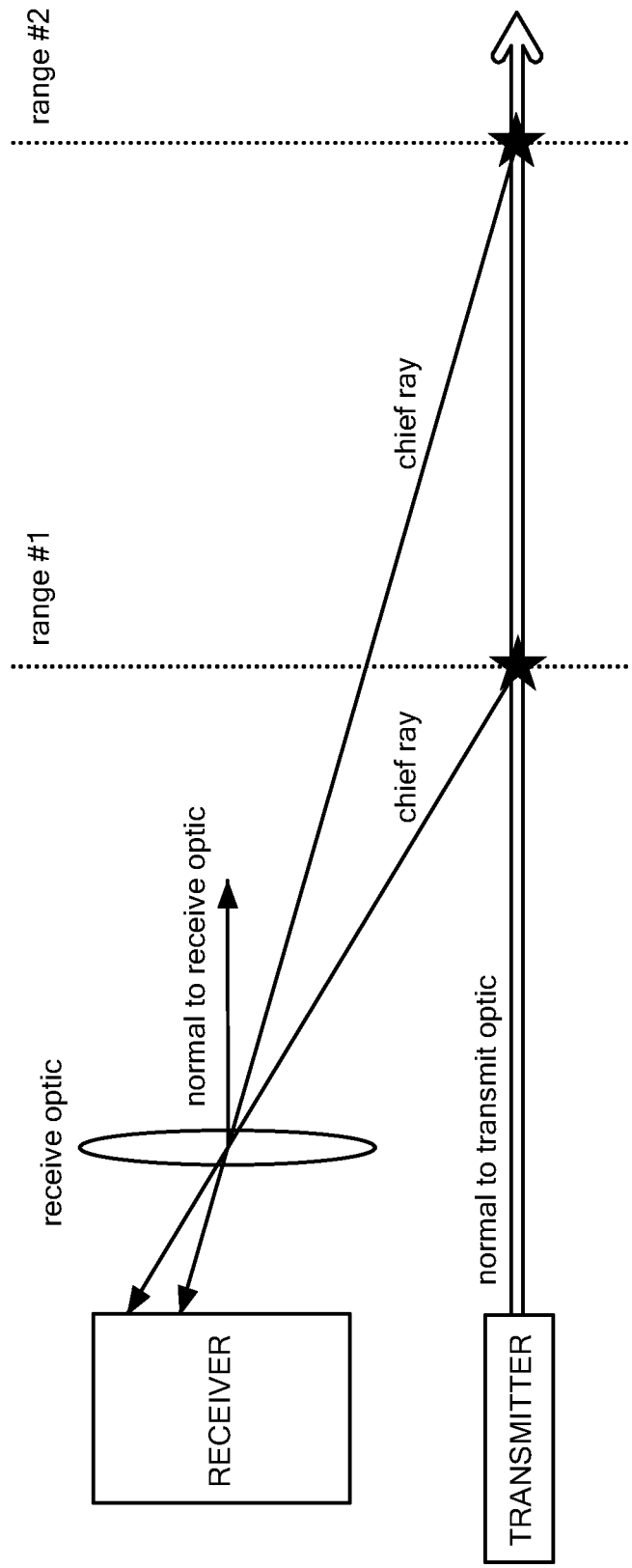
FIG. 2C is a schematic representation of an example bistatic lidar system showing objects at different distances having parallax compensation in accordance with example embodiments of the disclosure.

FIG. 2C shows an example bistatic 1D scanned lidar system having parallax compensation in accordance with illustrative embodiments of the disclosure. The transmit and receive paths are offset and substantially parallel and the laser stripe is projected along a ray normal to the transmitter so that the angle from a receive optic to the laser stripe in object space changes with object range so that the laser stripe image centroid moves on the receiver.

It is understood that system images the laser stripe at whatever azimuthal angle the scanner happens to point, and the laser stripe is always along the laser beam. The laser stripe and its image appear if an object happens to intersect the beam at different ranges from the transmitter. The transmit and receive paths are offset and substantially parallel, which causes the range-parallax effect.

As used herein, it is understood that the term "optic" refers to a mechanical or electromechanical light-changing component external to a photoreceiver unless explicitly defined to be part of the photoreceiver. It is further understood that a photoreceiver may include a transparent window as part of the photoreceiver that is not considered to be an optic. For example, a photoreceiver may comprise a component sold as a package to which an optic may be attached and/or positioned in relation to the package to form a system. Unless defined otherwise, a photoreceiver comprises a photodetector array that can include a number of pixels.

In the illustrated configuration, a receive optic, such as a lens, is placed in front of the receiver that forms an image of the laser stripe on the receiver. As can be seen, the chief ray from a point in object space (e.g., the centroid of the laser stripe where it has been projected onto an object in the laser beam path) passes straight through the optics plane to the centroid of its image on the receiver. As illustrated, the centroid of the laser stripe image moves on the receiver as the laser stripe approaches the transmitter in object space.

Figure 3A:
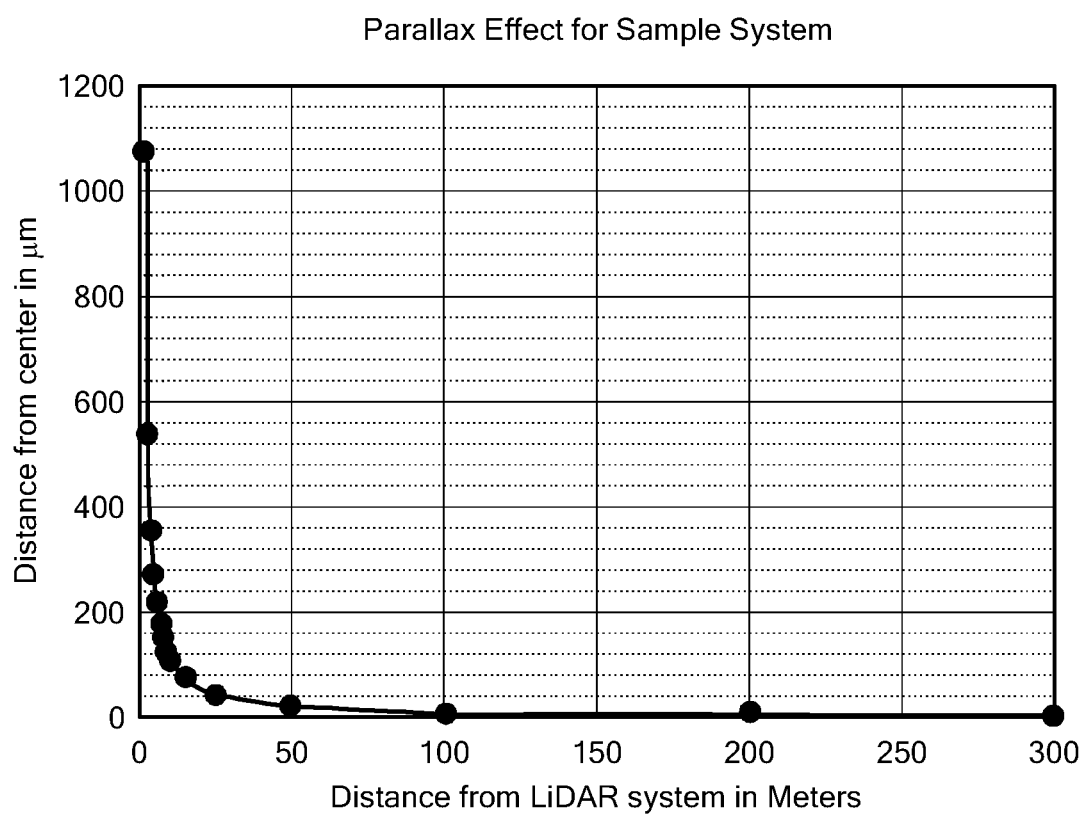
FIG. 3A is a graphical representation showing parallax effects in a photonic detection system.

An example detector system can include a transmitter to transmit energy, such as laser pulses, that can be reflected by a near object, a far object, and/or a very far object. A detector can include a detector array, such as an APD array, to detect the pulses from the near, far and/or very far objects. An optic, such as a lens, may focus received energy onto the detector As can be seen, in a LiDAR system with the transmitter and receiver separated by some distance, based on the angle of return the reflected light will hit the detector in a different position, which varies a very small amount for far objects. In example embodiments, as objects are closer, the centroid of the laser stripe image is formed further from the center of the detector array, assuming the laser stripe image is centered on the detector for objects at infinity, as can be seen in FIG. 3A, which graphically shows object distance from the detector system versus stripe image distance from the center of the detector area. In addition, the optical signal return strength is significantly higher for near objects as compared to far objects.

Figure 3B:
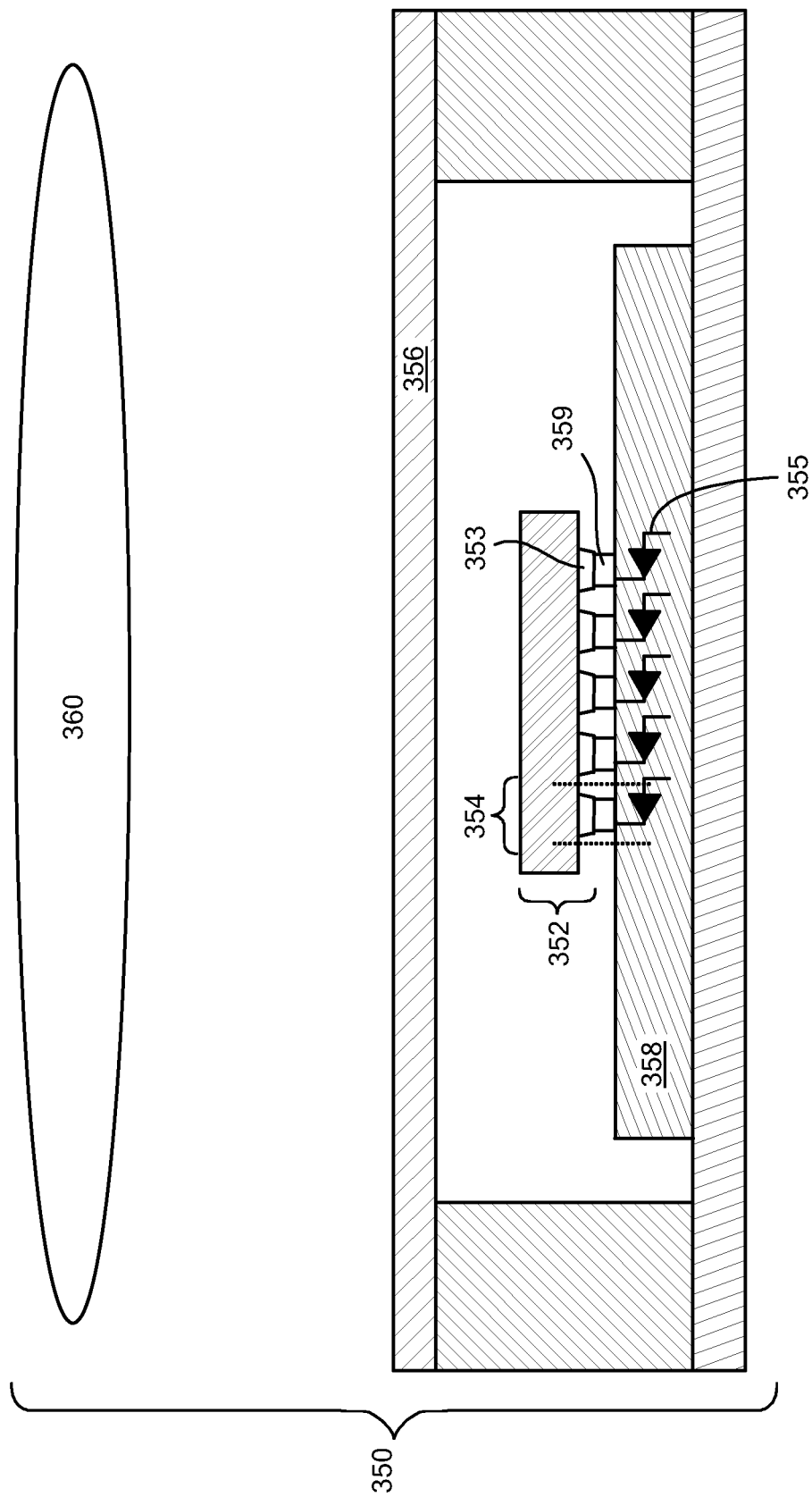
FIG. 3B is a schematic representation of a photonic sensor having parallax compensation in accordance with example embodiments of the disclosure.

FIG. 3B shows an example photoreceiver 350 that can be provided as an IC package. The receiver IC package 350 includes a photodetector array 352 having photodetector elements 353, such as photodiodes, that operate as transducers to generate electrical signals in response to photonic energy. Pixels 354 can be formed from one or more photodetectors 353 and circuitry 355. The IC package 350 can include a transparent window 356 to enclose the detector array 352. The package 350 can include an optional ROIC 358 electrically connected 359 to the detector array 352 and/or circuitry. An external optical element 360 can be positioned in relation to the detector array 352 to manipulate light to meet the needs of a particular application. An external transmitter, such as a laser, can transmit pulses.

As used herein, an optic refers to any object that is part of the IC package and affects the optical path of light that may be incident on the detector array. An optic should be construed broadly to include a wide variety of structures, such as optically transparent windows, mirrors of any reflectivity, lens, microlens, etc. As used herein, an optical element refers to an object that may be separate from the IC package, such as a lens, a diffraction grating, a prism, and the like. An optical element may include a focal length.

Figures 4, 5, 6:
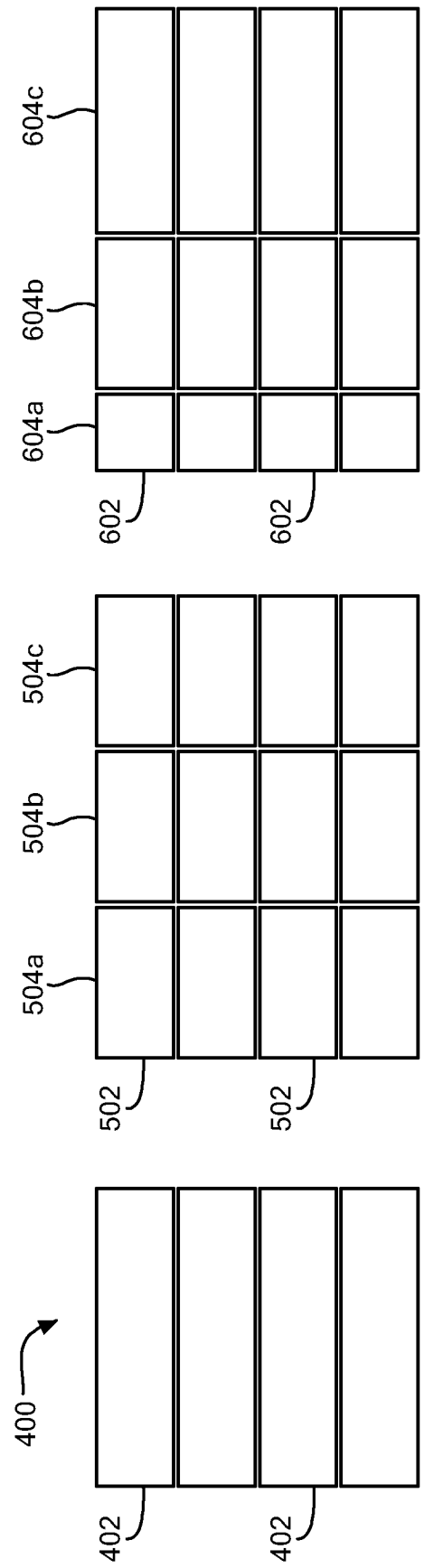
FIG. 4 is a schematic representation of a prior art pixels in a detection array.
FIG. 5 is a schematic representation of a detection array having pixel segmentation.
FIG. 6 is a schematic representation of a detection array having pixel segmentation with varying dimensions.

FIG. 4 shows a conventional one-dimensional (1D) linear array 400 having pixels 402 generally elongated, e.g., rectangles, to mitigate parallax effects by enabling closer returns to land on an active area of photodetection.

FIG. 5 shows a linear array 500 in which pixels 502 have a number of subpixel regions/segments 504a,b,c. The left-most subpixel region 504a is configured to receive photonic return from the furthest objects and the right-most subpixel region 504c is configured to receive photonic return from the closest objects. This configuration can be reversed if the transmitter and receiver relative position are reversed.

FIG. 6 shows a linear array 600 in which pixels 602 have a number of subpixel regions 604a,b,c each having a surface area corresponding to object distance. In general, subpixel region varies along one dimension, e.g., a cross-axis direction corresponding to target range, to take advantage of the exponential shape of the curve shown in FIG. 3A. In the illustrated embodiment of FIG. 6, the cross-axis direction can be referred to as width.

In the illustrated embodiment, the left-most subpixel region 604a is configured to receive photonic return from the furthest objects and the right-most subpixel region 604c is configured to receive photonic return from the closest objects. In the illustrated embodiment, the left-most subpixel region 604a is configured for a majority of signal return range, for example about 25 meters to infinity, the middle pixel 604b is configured for an example range of about 10 to about 25 meters, and the rightmost pixel 604c is configured for an example range of about 2 meters to about 10 meters.

As closer returns contain greater photonic energy since energy falls off with distance D by $1/D^2$ to $1/D^4$, the structure of the subpixel regions 604 can be optimized to manage returns at these distances. In embodiments, the left-most subpixel regions 604a can be biased at higher voltages while accounting for the fact that signals on the left-most subpixel regions will be small and will require maximum gain. In addition, the left-most subpixel regions 604a will likely not see high energy so that protection against excessive photonic stimulation may not be needed. The left-most subpixel regions 604a which have less area than other subpixel regions 604b,c, have lower capacitance, dark current, and dark current induced noise, and thus, increased signal-to-noise ratio (SNR).

The right-most subpixel region 604c may be biased at lower voltages than the other subpixel regions 604a,b. The right-most subpixel region 604c may be larger in area and have more noise than the other segments since the return signals are higher. The lower bias voltage may also protect the right-most subpixel region 604c from signal return from highly reflective close targets.

Figure 6A:
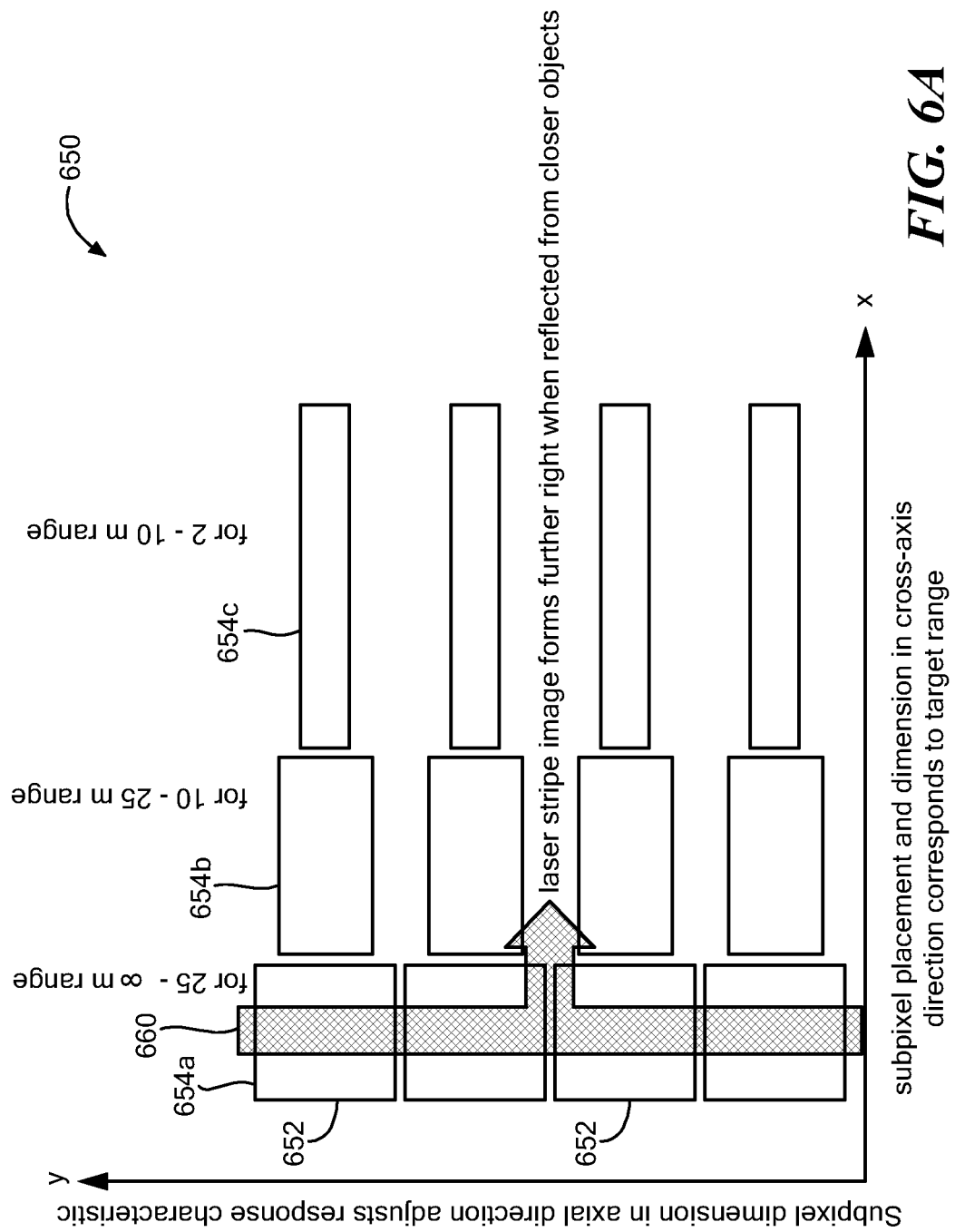
FIG. 6A is a schematic representation of a detection array having pixel segmentation with varying dimensions in multiple axes.

FIG. 6A shows a further array 650 in which pixels 652 have a number of subpixel regions 654a,b,c that change in first and second directions, e.g., axial and cross-axial with respect to a laser stripe image that forms further to the right when reflected from closer objects, as shown in FIG. 3A, for example. Example ranges are shown for each of the subpixel regions 654a,b,c. In general, subpixel region geometry varies to take advantage of the exponential shape of the curve shown in FIG. 3A. In the illustrated embodiment, a first axis (x-axis) corresponds to subpixel placement and dimension in a cross-action direction corresponding to target range and a second axis (y axis) corresponds to subpixel dimension in an axial direction that adjusts response characteristics.

As noted above, the subpixels 654 intended to respond to stronger signals from closer objects are shown to narrow in the axial direction to reduce their response to the signal. In the illustrated embodiment, a laser stripe image 660 is superimposed on the subpixels to note that it moves right when reflecting from closer objects, as shown in FIG. 3A. The locations and dimensions of the subpixels 654a,b,c in the cross-axis direction correspond to selecting the range they respond to (in accordance with FIG. 3A) and the subpixel dimension in the axial direction adjusts how responsive the subpixels are to the available signal).

In example embodiments, a pixel can include a first subpixel region having a first light response characteristic and a second subpixel region having a second light response characteristic. The first and second light response characteristics are configured to correspond to variations in intensity of reflected light from objects at different distances when apportionment between the first and second subpixel regions of the reflected light reaching the first one of the pixels changes with a range of the objects. It is understood that apportionment refers to reflected light comprising one or more portions reaching at least one subpixel region. A first portion of reflected light can include from 0% to 100%, inclusively, and a second portion can include from 0% to 100%, inclusively. That is, while changes in object range can result in apportionment of the reflected light among multiple subpixel regions, there may be instances when all of the reflected length reaches one particular subpixel region.

In some embodiments, subpixel regions can be connected to APD bias voltages and amplification circuits that match the expected magnitude of the returns based on distance. Gain implemented in the amplification circuits is customized to the expected return signal range. Respective damage thresholds, e.g., near/close/very close channels, are customized to the expected return signal range. In embodiments, modifying the APD gain affects the damage threshold of the photodetector and amplifier. Modified high signal clamping structures and/or amplifier device type (e.g., thick vs thin oxide transistor devices) may affect the damage threshold of the amplifier.

In some embodiments, multiple subpixel regions can be connected to APD bias voltages and amplification circuits to detect signal return in any of the subpixel regions. It is understood that any practical set of subpixel regions can be connected to a given circuit to meet the needs of particular application.

FIG. 7A shows an example circuit for a subpixel region for near returns, FIG. 7B shows an example circuit for a subpixel region for close returns, and FIG. 7C shows an example circuit for a subpixel region for very close returns. FIG. 7A shows a photodiode 700 having a cathode coupled to a bias voltage 702, which is shown as 60V, and an anode coupled to an amplifier 704, such as a transimpedance amplifier (TIA), having a relatively high gain. A relatively small clamping structure 706 is coupled to the anode of the photodiode 700. The pixel output is provided by the output of the TIA 704.

FIG. 7B shows a photodiode 710 having a cathode coupled to a bias voltage 712, which is shown as 50V, and an anode coupled to an amplifier 714, such as a transimpedance amplifier (TIA), having a medium gain. A medium clamping structure 716 is coupled to the anode of the photodiode 710.

FIG. 7C shows a photodiode 720 having a cathode coupled to a bias voltage 722, which is shown as 50V, and an anode coupled to an amplifier 724, such as a transimpedance amplifier (TIA), having a relatively low gain. A relatively large clamping structure 726 is coupled to the anode of the photodiode 710.

It is understood that the bias voltage levels, the amplifier gain, and the clamping size can be selected to meets the needs of a particular application. It is further understood that relative terms, such as high, low, medium, small, and large are intended to facilitate an understanding of the example embodiments and not intended to be limiting in any way. One or more of the bias voltage levels, the amplifier gain, and the clamping size can be adjusted for a particular subpixel region.

FIG. 8A is a cross-sectional side view and FIG. 8B is a top view of a detector array 800 having photosensitive areas 802, such as pixels, a transparent substrate 804, and a light scattering feature 806, such as a ridge. Signal return, such as rays, can be incident on the substrate 804. Some rays 808 are directly incident on a photosensitive area 802 and some rays 810 are incident outside of the photosensitive areas 802. In embodiments, a ray 810 outside of any of the photosensitive areas 802 may strike the light scattering feature 806. At least some of the light 812 scattered by the scattering feature 806 may fall on a nearby photosensitive area 802.

It is understood that any practical number of light scattering features can be configured in any practical orientation to meet the needs of a particular application.

FIG. 9A is a top view and FIG. 9B is a cross-sectional view of a detector array 900 that may be similar to the array 800 of FIGS. 8A and 8B, where like reference numbers indicate like elements, with the addition of one or more light blocking features. FIG. 9B is a cross-sectional side view of the detector array 900.

A first light blocking feature 902 comprises a series of microstructures, such as teeth, formed from optically opaque material generally aligned with gaps 904 between the photosensitive areas 802. In embodiments, regions 906 between the first light blocking features 902 form an optical path from the light scattering feature 806 to a respective one of the photosensitive areas 802. A ray 908 incident on the light scattering feature 806 results in some scattered light onto the photosensitive area 802 via the aligned region 906 between adjacent first light blocking features 902 and some scattered light being blocked, e.g., absorbed, by the first light blocking features 902.

With this arrangement, crosstalk between channels for each of the photosensitive areas 802 can be reduced and signals outside a desired field of view (FOV) can be blocked.

The detector array 900 can include a second light blocking feature 910 which may be located on the periphery of the array. In the illustrated embodiment, the second light blocking feature 910 blocks light from a signal ray 912 near an edge of the array.

It is understood that the number, location, material, geometry, configuration, etc., of the first and second light blocking features 902, 910 can vary to meet the needs of a particular application. Example materials include, but are not limited to, plated Au and Ni, black-anodized Ni, opaque epoxies or resins containing light-absorbing pigments, and back paint.

FIG. 10A is a top view and FIG. 10B is a cross-sectional side view of a detector array 1000 having photosensitive areas 1002, such as pixels, a transparent substrate 1004, and one or more light waveguides 1006. Signal return, such as rays, can be incident on the substrate 1004. Some rays 1008 are directly incident on a photosensitive area 1002 and some rays 1010 are incident outside of the photosensitive areas 1002. In embodiments, a ray 1010 outside of any of the photosensitive areas 1002 may strike the waveguide 1006. The light 1012 captured by the waveguide 1006 may fall on the photosensitive area 1002 with which it is aligned.

In embodiments, the waveguides 1006 can include a number of taps 1014 through which light can enter the waveguide. The waveguide 1006 can comprise any configuration suitable to receive and guide light to a respective photosensitive areas 1002. In example embodiments, the waveguide 1006 comprises a rib waveguide FIG. 11A shows a portion of an example detector array 1100 having a photosensitive area 1102 on a substrate 1104. In embodiments, a reflector 1106 extends up from the substrate 1104 at an edge of the photosensitive area 1102. As described above, due to parallax, a first signal 1108 can comprise return received from a close-range object, a second signal 1110 can comprise return received from a mid-range object, and a third signal 1112 can comprise return received from a far range object. In the illustrated embodiment, the reflector 1106 includes a mirrored surface 1114 so that at least some of the first signal 1108 from the close-range object is reflected onto the photosensitive area 1102.

It is understood that the reflectivity of the mirrored surface 1114 can be selected to meet the needs of a particular application.

FIG. 11B shows an example detector array 1120 having some commonality with the detector array 1100 of FIG. 11A where like reference numbers indicate like elements, and including a gradient optic 1121 having a transparent layer 1122, such as glass, on the photosensitive area 1102 and a gradient coating 1124. The gradient optic 1121 refracts the light incident on the gradient coating, as shown. In embodiments, the gradient coating 1124 comprises a neutral density (ND) filter. In embodiments, a reflector 1106 extends up from the substrate 1104 and includes a polished metallic surface 1126 so that at least some of the first signal 1108 from the close range object is reflected onto the photosensitive area 1102 of the detector.

FIG. 11C shows an example detector array 1140 having some commonality with the detector array 1100 of FIG. 11A where like reference numbers indicate like elements, and including a gradient optic 1141 having a microlens 1142 with a gradient coating 1144. The gradient optic 1141 focuses incident light onto the photosensitive area 1102 of the detector, as shown.

FIGS. 11D, 11E, and 11F, show backside illuminated configurations for the detector arrays of FIGS. 11A, 11B, and 11C, respectively.

As noted above, generally pixels for photonic detectors are circular, square or rectangular with the shape selected to balance a number of factors, such as capacitance and required field of view.

Figure 12:
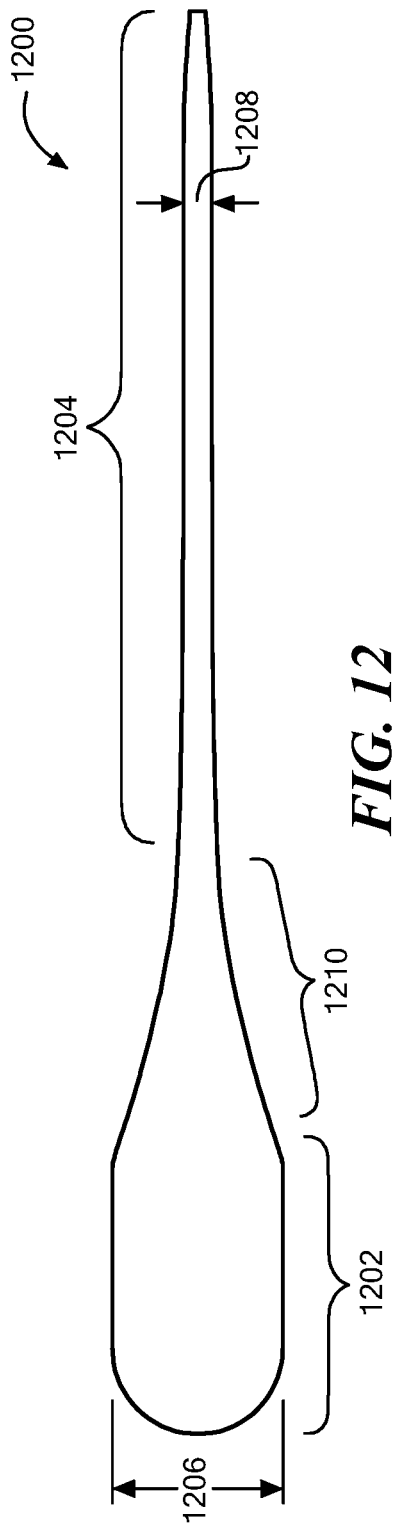
FIG. 12 is a top view of a pixel in a detection array having a teardrop shape.

FIG. 12 shows an example detector 1200 having a teardrop shape to mitigate parallax in detectors arrays, such as in LiDAR systems, where the returns from a closer object may be off center of the optical system return path, as shown and described above. Signal return may be off center and higher in amplitude. By extending and narrowing a pixel to allow for off center returns to be detected, near detection range of the system is improved as compared with detector arrays having known shaped pixels.

In the illustrated embodiment, the pixel 1200 comprises a head portion 1202 and a tail portion 1204. The head portion 1202 has a distance 1206 across a first dimension that is less than a corresponding distance 1208 of the tail portion. In some embodiments, the head portion 1202 is generally bulbous and the tail portion 1204 is elongate with a taper. In some embodiments, the pixel 1200 includes a transition portion 1210 between the head portion 1202 and the tail portion 1202.

In embodiments, the teardrop shape has less area, and therefore less capacitance, dedicated for off-center, larger magnitude returns of close objects. By shaping the pixel like a teardrop, one can keep the bulk of the pixel area in the center/head region 1202 where longer range returns will be incident. The thinner tail region 1204 extends outward to pick up on the larger but off-center returns. It is understood that the term "teardrop shape" should be construed broadly to include any shape having a wider portion and an elongate thinner portion.

In some embodiments, the teardrop pixel 1200 is segmented along one or more axes, as shown in FIG. 5, FIG. 6, and/or FIG. 6A, for example.

Figure 13:
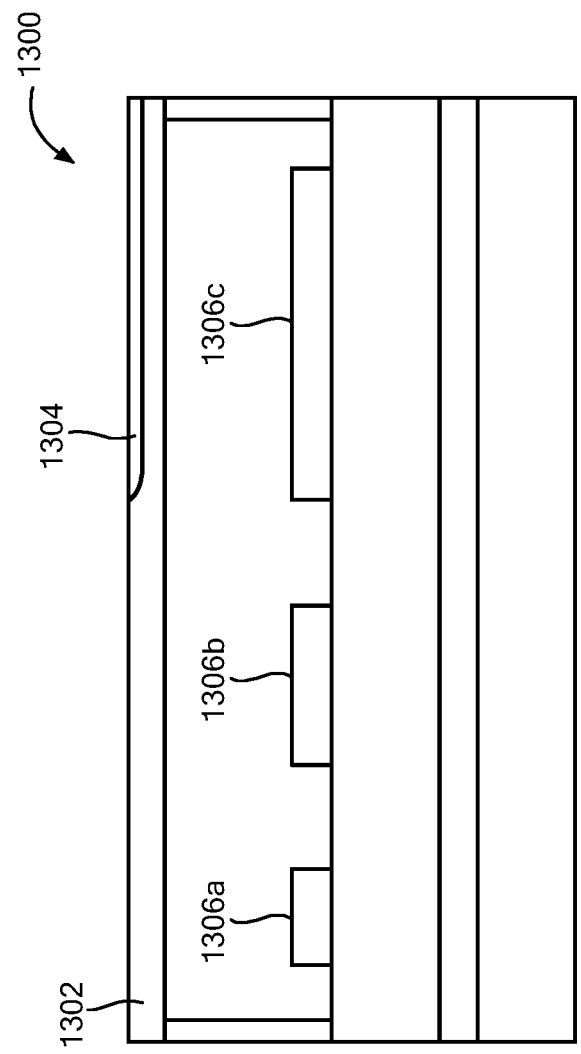
FIG. 13 is a cross-sectional view of a receiver including a window having a region of increased reflectivity.

FIG. 13 shows a receiver 1300 including a window 1302 with a region 1304 of increased reflectivity, scattering, or higher absorption to decrease an amount of photonic energy passing through the region and hitting the pixel or subpixel region. In the illustrated embodiment, the receiver 1300 can include subpixel regions similar to the configuration of FIG. 6 so that subpixel regions 1306a, 1306b, 1306c each have a surface area corresponding to object distance. In the illustrated embodiment, the left-most subpixel region 1306a is configured to receive photonic return from the furthest objects and the right-most subpixel region 1306c is configured to receive photonic return from the closest objects. As the right side of the window may receive the largest amount of photonic energy due to near object signal return, the region 1304 reduces an amount of photonic energy on the right-most subpixel region 1306c.

It is understood that any suitable technique, material, coating, etc., can be used to provide the region 1304 of increased reflectivity, scattering, or higher absorption. For example, the region 1304 can be generated by physical abrasion of the window surface to increase light scattering. In other embodiments, etching can be used to form the region 1304. In some embodiments, a coating can be used to reduce transmission or increase the absorption or reflection of the region 1304. In embodiments, a process such as plasma enhance chemical vapor deposition (PECVD) or chemical vapor deposition (CVD) can be used to place a material or multiple materials on the window to provide the region 1304. In an embodiment the material may be patterned using an etching process, etching may be one of or a combination of a dry or plasma process or a wet etching process, or the material or materials may be deposited with a shadow mask such that material is only deposited in or on select regions of the window material. In some embodiments, the reflectivity, and index of refraction, across the region 1304 can have a gradient. In embodiments, the system can include a window with a region of increased reflectivity to reduce an amount of energy on the detector.

Example embodiments of the disclosure enable the detection of objects closer to the detector that may not be detectable in conventional detectors due to the parallax effect. Subpixel regions having reduced area than other subpixel regions reduce the capacitance and noise of long range returns by using a limited portion of the detector area. In addition, the amplification circuitry has to manage a more limited amplitude range of returns since it is likely that there will not be very weak returns from a short range object. Embodiments having a narrowed detector for the longer range segment reduce capacitance/noise to allow for a larger segment adjacent where signal is known to be larger. Each element can be biased with a separate bias voltage to enable different gains per APD element. This arrangement increases sensitivity at the long range and reduces the probability of damage at the nearer ranges. In addition, such embodiments may allow for individual optimization of the amplifiers that receive current from the APD elements in terms of receiver sensitivity vs. dynamic range and/or damage threshold.

Embodiments including light scattering and/or optic elements may compress the signal dynamic range to avoid saturation and damage issues by using variable attenuation/coupling efficiency as functions of the distance between where a close object is imaged compared to where an object at infinity is imaged.

Figure 14:
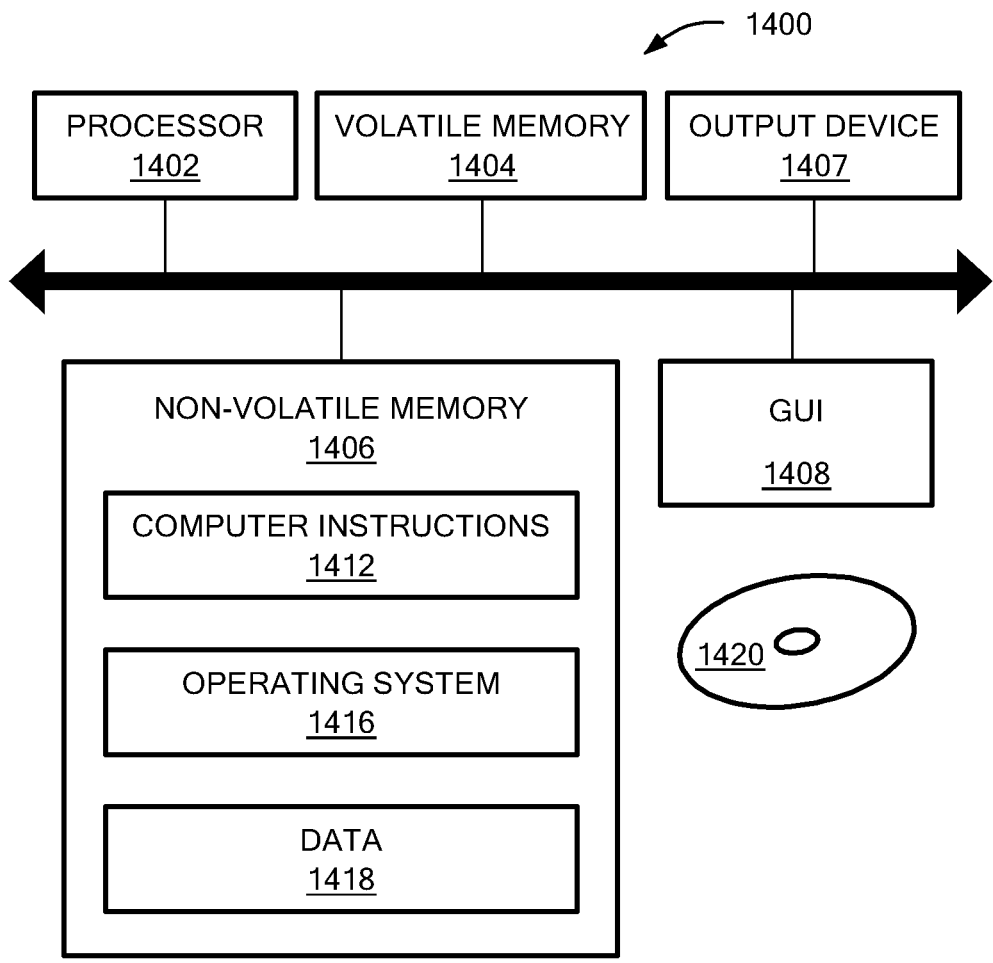
FIG. 14 is a schematic representation of an example computer that can perform at least a portion of the processing described herein.

FIG. 14 shows an exemplary computer 1400 that can perform at least part of the processing described herein. The computer 1400 includes a processor 1402, a volatile memory 1404, a non-volatile memory 1406 (e.g., hard disk), an output device 1407 and a graphical user interface (GUI) 1408 (e.g., a mouse, a keyboard, a display, for example). The non-volatile memory 1406 stores computer instructions 1412, an operating system 1416 and data 1418. In one example, the computer instructions 1412 are executed by the processor 1402 out of volatile memory 1404. In one embodiment, an article 1420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable embedded processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A photoreceiver, comprising:
a plurality of light-sensitive pixels to transduce light to electrical signals, wherein at least a first one of the pixels includes a first subpixel region having a first light response characteristic and a second subpixel region having a second light response characteristic, wherein the first and second light response characteristics are configured to correspond to variations in intensity of reflected light from objects at different distances when apportionment between the first and second subpixel regions of the reflected light reaching the first one of the pixels changes with a range of the objects, wherein the photoreceiver comprises: a transparent substrate; a light scattering structure off axis from the first subpixel region so that at least some light incident on the light scattering structure falls on the first subpixel region; and a light blocking structure having a series of microstructures forming channels from the light scattering structure to respective ones of detectors in the one-dimensional detector array.

2. The photoreceiver according to claim 1, wherein the first subpixel region has a dimension less than a corresponding dimension of the second subpixel region.

3. The photoreceiver according to claim 1, wherein the first subpixel region is biased at a higher voltage than the second subpixel region.

4. The photoreceiver according to claim 1, wherein the first subpixel region has a surface area that is less than a surface area of the second subpixel region.

5. The photoreceiver according to claim 1, further including a first circuit for the first subpixel region comprising a first photodiode having a first terminal coupled to a first bias voltage and a second terminal coupled to a first amplifier and a first clamping structure, and a second circuit for the second subpixel region comprising a second photodiode having a first terminal coupled to a second bias voltage and a second terminal coupled to a second amplifier and a second clamping structure.

6. The photoreceiver according to claim 5, wherein the first bias voltage is greater than the second bias voltage.

7. The photoreceiver according to claim 5, wherein the first amplifier has a higher gain than the second amplifier.

8. The photoreceiver according to claim 5, wherein the first clamping structure is smaller than the second clamping structure.

9. The photoreceiver according to claim 1, wherein the light scattering structure comprises a ridge.

10. The photoreceiver according to claim 9, wherein the ridge is positioned to be parallel to a one-dimensional detector array that includes the first subpixel region.

11. The photoreceiver according to claim 1, wherein the photoreceiver further comprises a transparent substrate and a waveguide to capture light that is incident off the axis of a one-dimensional detector array that includes the first subpixel region, so that at least some light incident on the waveguide falls on the first subpixel region.

12. The photoreceiver according to claim 11, wherein the waveguide comprises a rib waveguide.

13. The photoreceiver according to claim 11, wherein the waveguide comprises a series of taps to couple light into the waveguide.

14. The photoreceiver according to claim 1, further including a substrate to support the first subpixel region and a reflector extending from the substrate, the reflector having a mirrored surface to reflect light onto the first subpixel region.

15. The photoreceiver according to claim 1, further including a substrate to support the first subpixel region, a reflector extending from the substrate, and an optic, wherein the reflector comprises a reflective surface to reflect light onto the first subpixel region.

16. The photoreceiver according to claim 15, wherein the photoreceiver further comprises a transparent window with a gradient coating to refract light onto the first subpixel region.

17. The photoreceiver according to claim 1, wherein the photoreceiver further comprises a microlens with a gradient coating to focus received light onto the first subpixel region.

18. The photoreceiver according to claim 1, wherein the first subpixel region comprises a head portion of a teardrop shape and the second subpixel region comprises a tail portion of the teardrop shape.

19. The photoreceiver according to claim 1, wherein the photoreceiver further includes a window with a region of increased reflectivity.

20. A photoreceiver, comprising:
a single light-sensitive pixel to transduce light to electrical signals, wherein the pixel includes a first subpixel region having a first light response characteristic and a second subpixel region having a second light response characteristic, wherein the first and second light characteristics are configured to correspond to variations in intensity of reflected light from objects at different distances when the portion of the reflected light reaching the pixel is imaged onto the first and second subpixel regions;
a transparent substrate;
a light scattering structure off axis from the first subpixel region so that at least some light incident on the light scattering structure falls on the first subpixel region; and
a light blocking structure having a series of microstructures forming channels from the light scattering structure to respective ones of detectors in the one-dimensional detector array.

21. The photoreceiver according to claim 20, wherein the first subpixel region has a dimension less than a corresponding dimension of the second subpixel region.

22. The photoreceiver according to claim 20, wherein the first subpixel region is biased at a higher voltage than the second subpixel region.

23. The photoreceiver according to claim 20, wherein the first subpixel region has a surface area that is less than a surface area of the second subpixel region.

24. The photoreceiver according to claim 20, wherein the photoreceiver further comprises a transparent substrate and a waveguide to capture light that is incident off the axis of a one-dimensional detector array that includes the first subpixel region, so that at least some light incident on the waveguide falls on the first subpixel region.

25. The photoreceiver according to claim 20, further including a substrate to support the first subpixel region and a reflector extending from the substrate, the reflector having a mirrored surface to reflect light onto the first subpixel region.

26. The photoreceiver according to claim 20, further including a substrate to support the first subpixel region, a reflector extending from the substrate, and an optic, wherein the reflector comprises a reflective surface to reflect light onto the first subpixel region.

27. The photoreceiver according to claim 26, wherein the photoreceiver further comprises a transparent window with a gradient coating to refract light onto the first subpixel region.

28. The photoreceiver according to claim 20, wherein the photoreceiver further comprises a microlens with a gradient coating to focus received light onto the first subpixel region.

29. The photoreceiver according to claim 20, wherein the first subpixel region comprises a head portion of a teardrop shape and the second subpixel region comprises a tail portion of the teardrop shape.

30. The photoreceiver according to claim 20, wherein the photoreceiver further includes a window with a region of increased reflectivity.

31. A method, comprising:
transducing light to electrical signals using a light-sensitive pixel in a photoreceiver, wherein the pixel includes a first subpixel region having a first light response characteristic and a second subpixel region having a second light response characteristic, wherein the first and second light characteristics are configured to correspond to variations in intensity of reflected light from objects at different distances when the portion of the reflected light reaching the pixel is imaged onto the first and second subpixel regions;

employing a transparent substrate;

employing a light scattering structure off axis from the first subpixel region so that at least some light incident on the light scattering structure falls on the first subpixel region; and employing a light blocking structure having a series of microstructures forming channels from the light scattering structure to respective ones of detectors in the one-dimensional detector array.

32. The method according to claim 31, wherein the first subpixel region has a dimension less than a dimension of the second subpixel region.

33. The method according to claim 31, wherein the first subpixel region is biased at a higher voltage than the second subpixel region.

34. The method according to claim 31, further including transducing light to electrical signals using a pixel array.

35. The method according to claim 31, wherein the first subpixel region has a surface area that is less than a surface area of the second subpixel region.

36. The method according to claim 31, wherein the photoreceiver further comprises a transparent window with a gradient coating to refract light onto the first subpixel region.

37. The method according to claim 31, wherein the photoreceiver further comprises a microlens with a gradient coating to focus received light onto the first subpixel region.

38. The method according to claim 31, wherein the first subpixel region comprises a head portion of a teardrop shape and the second subpixel region comprises a tail portion of the teardrop shape.

39. The method according to claim 31, wherein the photoreceiver further includes a window with a region of increased reflectivity.

* * * * *